United States Patent
Hibino et al.

(12) 
(10) Patent No.: US 6,229,938 B1
(45) Date of Patent: May 8, 2001

(54) WDM FILTER

(75) Inventors: Yoshinori Hibino; Akira Himeno; Makoto Abe; Takuya Tanaka; Shin Kamei; Akimasa Kaneko, all of Mito (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/494,554

(22) Filed: Jan. 31, 2000

(30) Foreign Application Priority Data

Feb. 1, 1999 (JP) .................................................. 11-023965

(51) Int. Cl.[7] ...................................................... G02B 6/26
(52) U.S. Cl. ................................ 385/24; 385/37; 385/46; 359/124; 359/130
(58) Field of Search .................................. 385/24, 37, 14, 385/16, 46, 43; 359/127, 124, 130, 115

(56) References Cited

U.S. PATENT DOCUMENTS

| 5,754,718 | * | 5/1998 | Duck et al. ........................ 385/37 X |
| 5,818,986 | * | 10/1998 | Asawa et al. ........................ 385/24 |
| 6,055,349 | * | 5/1998 | Seino et al. ........................ 385/46 X |

* cited by examiner

*Primary Examiner*—Phan T. H. Palmer
(74) *Attorney, Agent, or Firm*—Venable; Robert J. Frank; Ashley J. Wells

(57) ABSTRACT

The present invention provides a wavelength division multiplexing filter that requires lower costs, a smaller size, and a smaller amount of fiber routing operations. According to the present invention, a first module constitutes a first filter. A second module constituting a second filter is produced by connecting together circuits identical in number to a plurality of output ports of the first module, the circuits each comprising a combination of directional couplers and Bragg gratings both formed of silica-based-glass waveguides, the circuits each having a wavelength selection characteristic so as to correspond to each of the output ports. The second module is connected to the first module via an 8-fiber ribbon to simplify the integration and connection of the circuits.

44 Claims, 21 Drawing Sheets

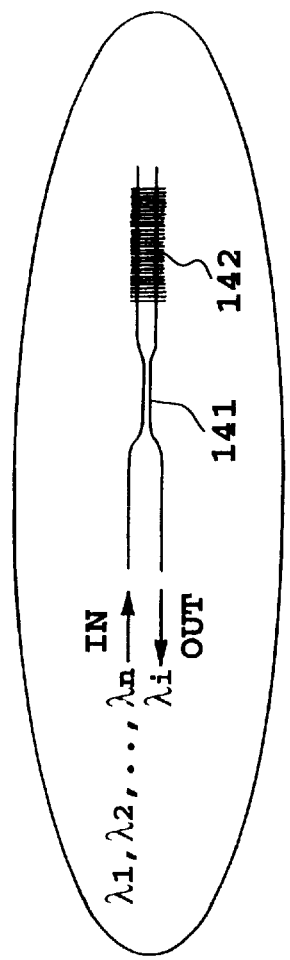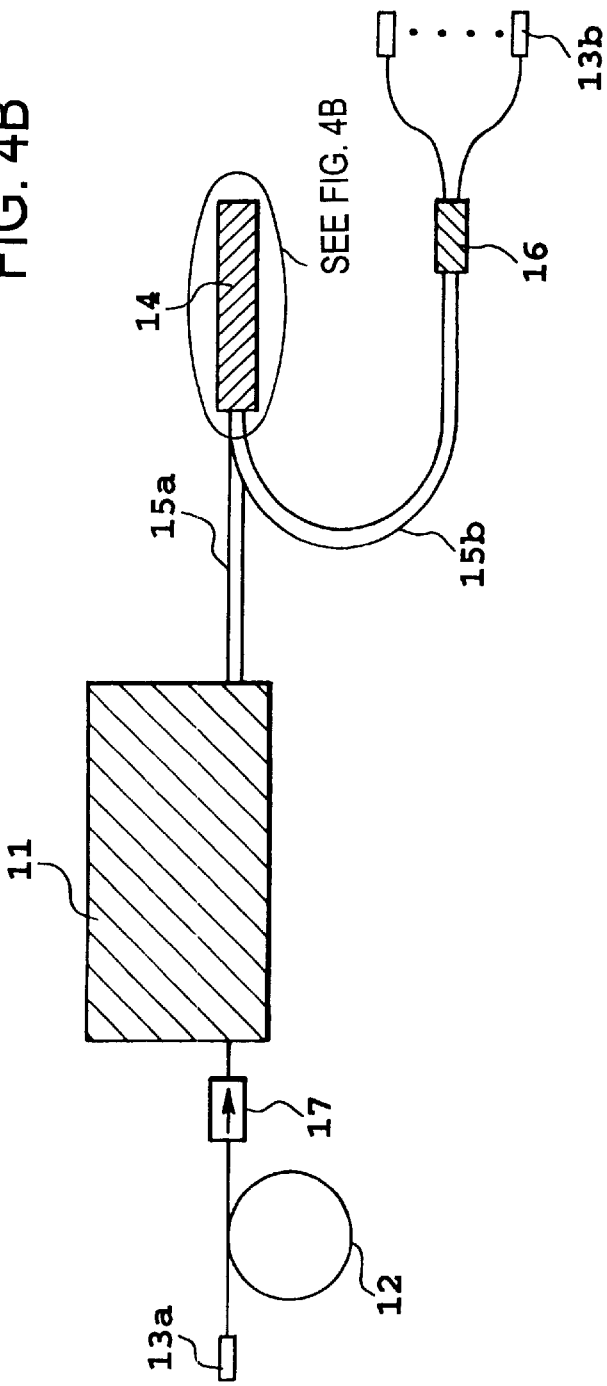
FIG. 4B
FIG. 4A

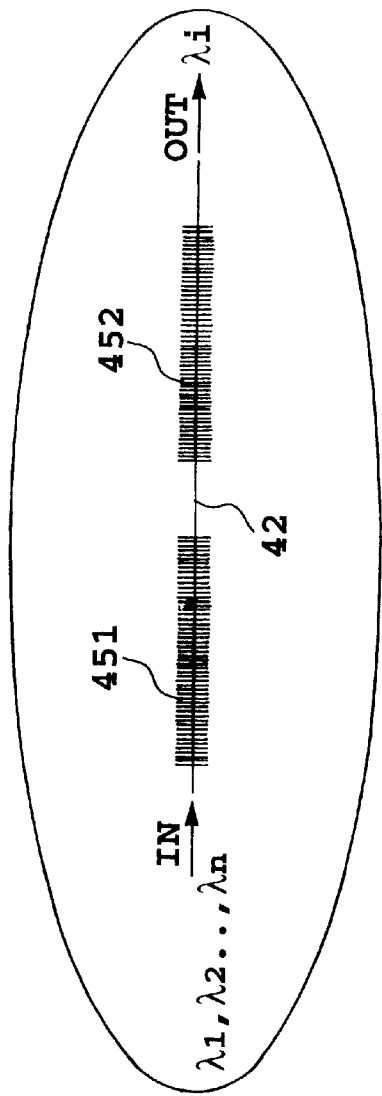
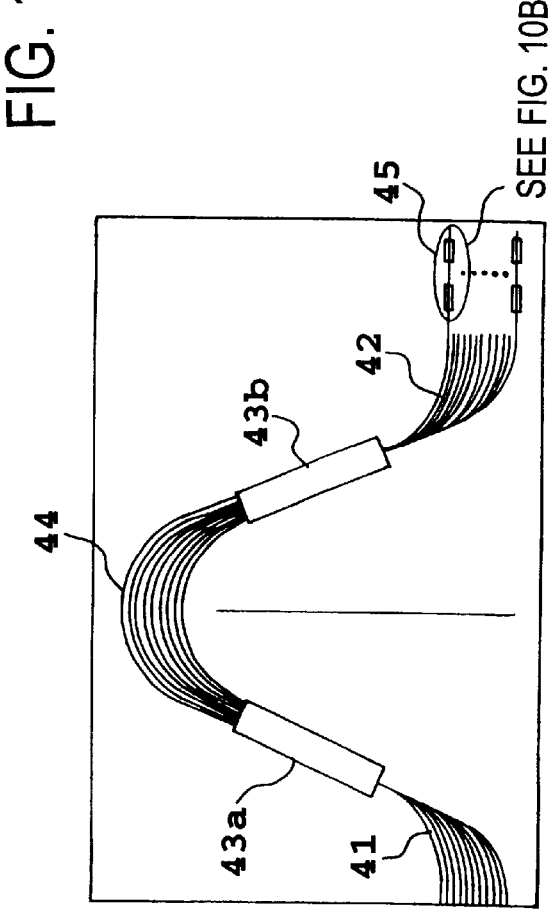
FIG. 10B
FIG. 10A

WDM FILTER

This application is based on Patent Application No. 11-23965 filed on Feb. 1, 1999 in Japan, the content of which is incorporated hereinto by reference.

BACKGROUND OF THE INVENTION

2. Field of the Invention

The present invention relates to a wavelength division multiplexing filter comprised of optical circuits formed on a planar substrate such as a Si substrate, and more particularly, to a wavelength division multiplexing (WDM) filter comprised of an optical circuit structure capable of improving a wavelength separation (crosstalk) characteristic.

2. Description of the Prior Art

The rapid and wide spread of Internet and e-mails is rapidly increasing the capacity of communication circuits principally in the U.S. A key technique for increasing the capacity is a dense wavelength division multiplexing (DWDM) system that allows signal lights of different wavelengths to simultaneously propagate through a single optical fiber in order to substantially increase the communication capacity. The number of wavelengths multiplxed by this DWDM system is being increased from 8 to 16 channels, and the transmission capacity is being increased in response to development of multimedia industries such as Internet.

The DWDM system typically splits a light into 8 or 16 wavelengths at intervals of 100 or 200 GHz or combines such wavelengths together. Thus, a high-performance wavelength filter is a key device. The wavelength filter is required to accurately align wavelengths and to have a low loss and a high performance.

Interference film filter type optical combining devices principally comprised of micro-optics have been used up to eight waves. An increase in the number of channels, however, has increased the costs of this interference film filter type, so that an increasing number of planar lightguide circuits (PLC) are now used for relevant applications. This trend is assumed to be more distinct as the number of wavelengths increases.

The most general PLC filters are devices comprised of silica-based-glass waveguides. Silica-based-glass waveguides enable devices using an interference effect to be precisely produced to construct high-performance filters. In particular, silica-based-glass waveguides commonly used as wavelength division multiplexing filters are arrayed waveguide gratings (AWG) each principally comprised of a plurality of input waveguides, a plurality of output waveguides, a pair of slab waveguides, and a waveguide array consisting of a large number of waveguides of different lengths.

FIG. 1 shows a basic configuration of a wavelength-multiplexing filter (a wavelength combiner/splitter) based on AWGs. In this figure, 1 is a Si substrate; 2 is input waveguides; 3 is output waveguides; 4a and 4b are slab waveguides; and 5 is a waveguide array. FIG. 2 shows a typical spectrum from this filter. Since the output waveguide of an AWG depends on the wavelength, wavelengths can be combined or split. Due to their low loss, high wavelength accuracy, and good crosstalk characteristic, AWGs comprised of silica-based-glass waveguides are used for DWDM systems.

However, as the number of wavelengths for wavelength multiplexing increases, higher performance is required of filters, and particularly, an improved crosstalk characteristic is required in order to separate a large number of wavelengths. For example, for an AWG comprised of silica-based glass waveguides and having 32 channels are required to maintain crosstalk at 30 dB or more. As described above, an increase in the number channels allows the features of PLC AWGs to be exhibited, whereby improvement of the crosstalk characteristic is important to the AWG.

Furthermore, if the DWDM has a small separated wavelength interval of 25 GHz or less, the AWG circuit is easily subjected to phase errors in the waveguides, thereby degrading the crosstalk characteristic. Since the number of channels normally increases with decreasing wavelength interval, the effect of crosstalk characteristic degradation becomes distinct. Thus, improvement of the crosstalk characteristic is essential in using for a WDM system, AWGs having a small wavelength interval and a large number of channels.

In order to improve the crosstalk characteristic, two filters are conventionally used. In a configuration with an AWG provided as a first filter, an external filter is connected in each output port of the AWG to improve the crosstalk characteristic.

FIG. 3 shows a general configuration of a conventional wavelength division multiplexing filter with its crosstalk characteristic improved using external filters. In this figure, 6 is a wavelength division multiplexing filter based on AWGs, 7 is an external filter, and 8a, 8b, 8c are optical fibers. The external filter 7 comprises an interference film filter and is structured so that the interference film filter is located between the optical fibers each having a SELFOC lens attached to its tip.

Parallel beams are emitted from the SELFOC fibers. Due to its characteristics including a low loss and an excellent crosstalk characteristic, the interference film filter is effective as an external filter in terms of optical characteristics.

As described above, although the conventional DWDM filters generally include external filters to improve the crosstalk characteristic, this method has the disadvantage of increased costs and size. Another problem of this method is that fiber routing is cumbersome.

SUMMARY OF THE INVENTION

It is an object of the present invention to provide a wavelength division multiplexing filter that requires lower costs, a smaller size, and a smaller amount of fiber routing operations.

In order to eliminate the above disadvantages, the present invention uses as an external filter a planar optical circuit comprised of a planar lightguide circuit, wherein a plurality of planar optical circuits each designed to have an operating wavelength corresponding to each of a plurality of output ports in a first filter consisting of an AWG or the like are formed (arrayed) on a single or a plurality of substrates.

Due to this integration effect, the above configuration is advantageous in that a large number of circuits can be integrally produced on a planar substrate.

In addition, since these circuits can also be integrated with the first filter, the size of the entire device can be reduced. Furthermore, since this configuration requires a smaller amount of operations for routing optical fibers, handling during production is simplified.

The integration effect and the reduction in production time are expected to substantially reduce costs.

The present invention is characterized in that external fibers are each comprised of a planar lightguide circuit (PLC), and that external filters the number of which corresponds to the number of outputs of a first filter consisting of an AWG or the like are produced on a single or a plurality of circuits. This configuration has the following advantages:

1) A large number of circuits are integrally produced on a planar substrate, and this integration serves to reduce costs and sizes.

2) If the first filter is of a PLC type, all PLC chips can be integrated on a single substrate, thereby enabling the size of the entire device to be further reduced.

3) Increasing the bandwidth of the external filters enables production errors associated with the wavelength accuracy to be accommodated. Despite an increase in bandwidth, a large number of channels serve to sufficiently reduce crosstalk, and the contribution of the crosstalk reduction increases with increasing number of channels. Thus, a large number of arrayed external filter circuits can be efficiently produced by reducing the production accuracy.

4) The integration enables the use of tape fibers, thereby requiring a smaller amount of fiber routing operations. In addition, by integrating all circuits on a unit substrate, the needs for intermediate optical fibers for connection are eliminated. Thus, the production time can be reduced.

5) Due to the integration, this configuration only requires wavelength control for a single or a small number of substrates of the same material based on the temperature, thereby simplifying wavelength control for the external filters and enabling uniform wavelength control.

The above and other objects, effects, features and advantages of the present invention will become more apparent from the following description of embodiments thereof taken in conjunction with the accompanying drawings.

BRIEF DESCRIPTION OF THE DRAWINGS

FIG. 4 is a configuration diagram showing Embodiment 1 of a wavelength division multiplexing filter according to the present invention;

FIG. 10 is a detailed configuration diagram of a PLC chip showing Embodiment 3 of a wavelength division multiplexing filter according to the present invention;

DESCRIPTION OF THE PREFERRED EMBODIMENTS

Figure 1:
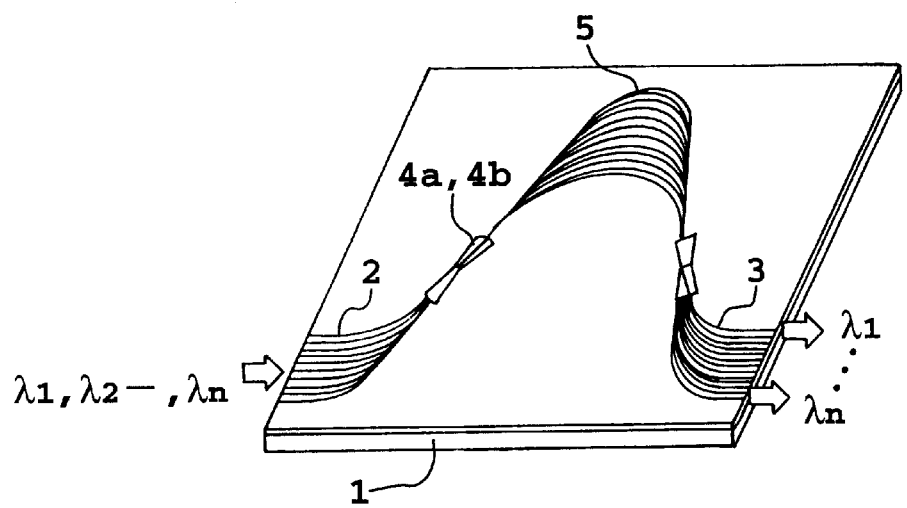
FIG. 1 shows a basic configuration of a wavelength division multiplexing filter based on an AWG.
Figure 2:
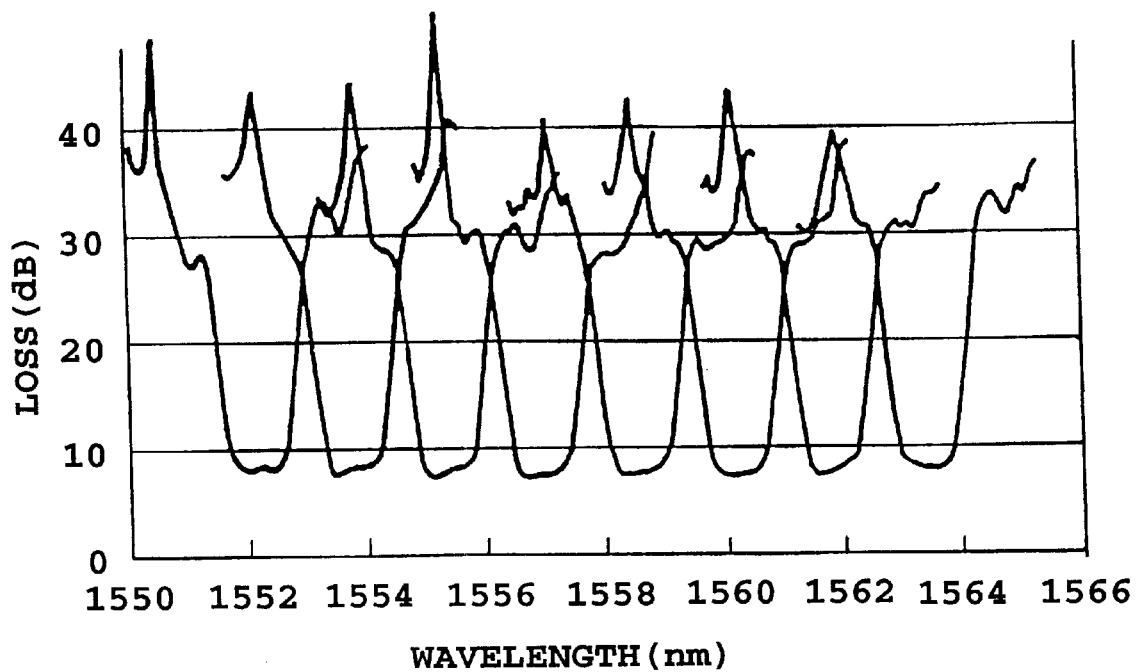
FIG. 2 shows a typical spectrum from a wavelength division multiplexing filter based on an AWG.
Figure 3:
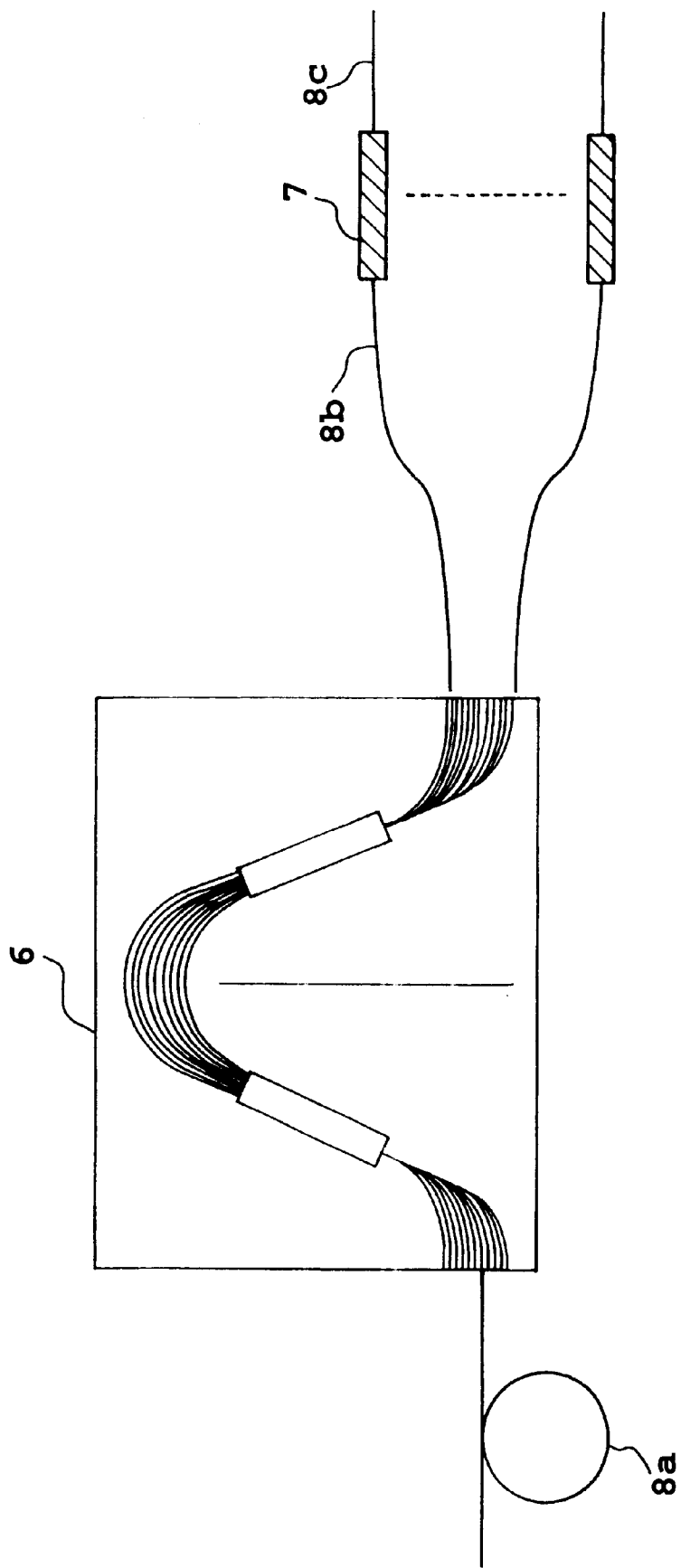
FIG. 3 shows a general configuration of a conventional wavelength division multiplexing filter with its crosstalk characteristic improved using external filters.

The present invention will be described below with reference to the embodiments.

[Embodiment 1 (AWG+Single Grating, Separation Type)]

Embodiment 1 shows an example in which a 32-channel AWG and a grating are combined to improve the crosstalk characteristic. The device is comprised of silica-based glass waveguides. FIG. 4 shows a general configuration.

In FIG. 4, 11 is a first module comprised of a 1× 32 AWG chip placed in a case; 12 is an input-side one-core fiber; 13a and 13b are connectors; 14 is a second module; 15a and 15b are 8-fiber ribbons (actually, 15a and 15b each include four 8-fiber ribbons); 16 is a fiber-ribbon branch section; and 17 is an isolator. Thermo-electric (TE) cooler elements are used for the two modules 11 and 14 to stabilize the temperature of the PLC chips and thus the operating wavelengths.

The second module 14 constitutes a second filter comprised of a chip placed in a case and produced by connecting 32 circuits each comprised of a directional coupler (DC) 141 formed of a silica-based-glass waveguide and a Bragg grating (BG) 142, the circuits identical in number to the output ports of the first module (the first filter) 11, as shown in FIG. 4 in an enlarged view.

The second module 14 is designed to maintain a coupling rate in the DC at 50%, and the Bragg wavelength and bandwidth are adjusted in the BG to allow a desired wavelength to be selectively reflected. Then, if a large number of wavelengths ($\lambda 1, \lambda 2, \ldots \lambda n$) are incident from an input port on one side of the DC, then only a wavelength equal to the Bragg wavelength in the BG is reflected and returns to the other port of the DC. In the module 14, the operating wavelengths in the 32 BGs connected together are offset so as to correspond to each channel of the module 11.

In the DC+BG device, if the coupling rate in the DC is not 50%, a small amount of light reflected from the BG also returns to the input port, thereby requiring antireflection measures. Thus, the device experimentally produced for this embodiment has the isolator 17 integrated into the input-side fiber 12.

The silica-based-glass waveguides constituting the optical device, as shown in FIG. 4 were obtained by forming a glass film by means of flame hydrolysis deposition (FHD) and producing a core by means of photolithography and reactive etching. After forming the core, embedding was carried out again by means of FHD. The substrate was formed of Si so as to have a thickness of 1 mm.

The production conditions and parameters of each device are listed below:

AWG

Core: 6×6 µm, Δ~0.75%

Wavelength interval: 100 GHz

Number of channels: 32

Chip size: 30×25 mm

Bragg grating

Core: 8×8 µm, Δ~0.3%

UV laser: excimer ArF

Production method: phase mask method

Irradiation intensity: ~100 J/cm$^2$

Irradiation time: 10 minutes

Grating length: 10 mm

Chip size: 10×25 mm

As described above, by connecting the 32 circuits together, the DG+BG device size could be reduced; that is, the chip size was reduced to 10×25 mm and the size of the module with the optical fiber connected thereto was reduced to 30×60×25 mm. The DC+BG device with 32 DCs and BGs connected together was irradiated with UV laser beams without the use of a phase mask so as to adjust the Bragg wavelength of each BG to the wavelength of a corresponding output of the AWG.

According to this embodiment, the AWG chip and the DC+BG chip were connected together via four 8-fiber ribbons as shown in FIG. 4.

Figure 5:
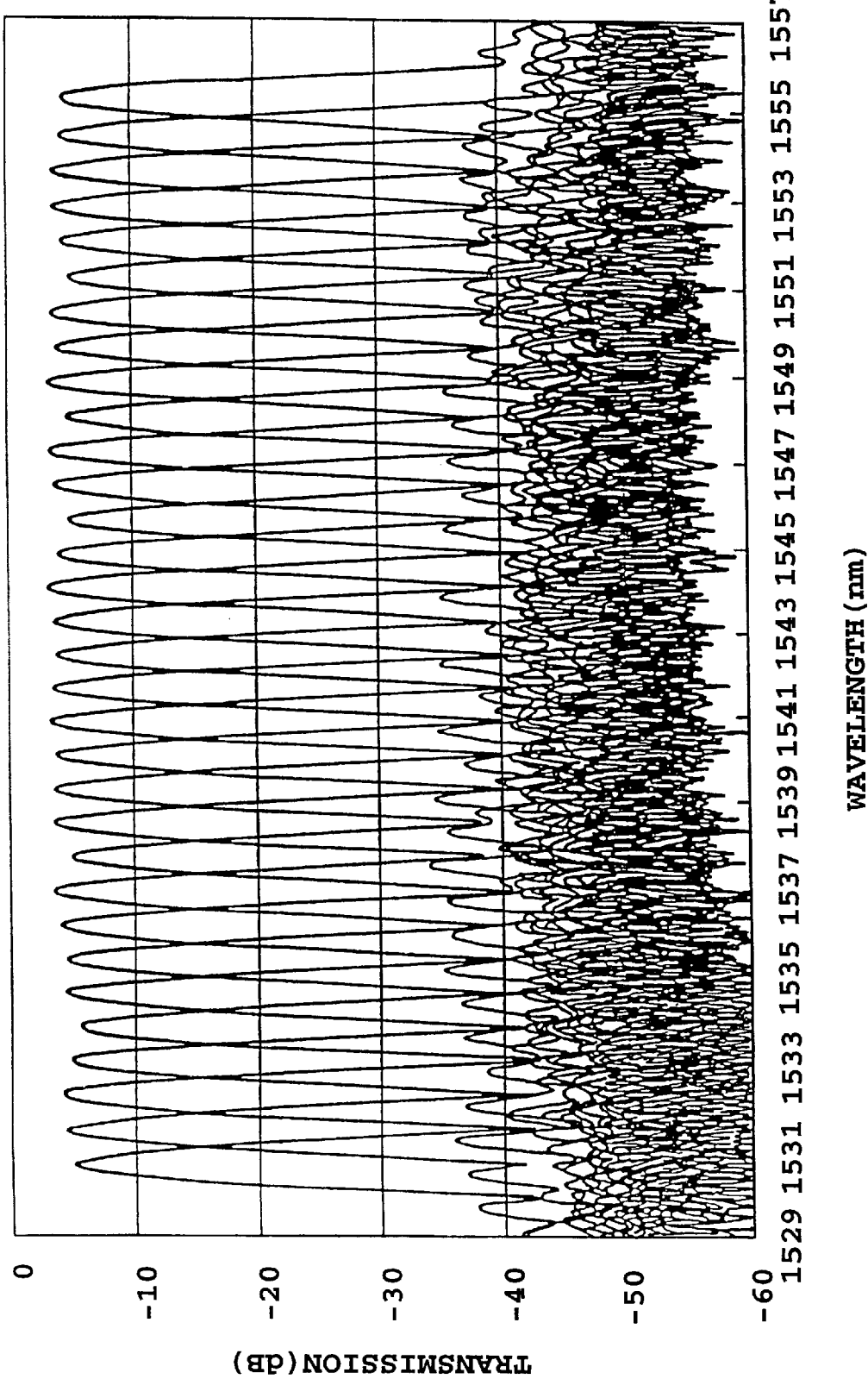
FIG. 5 shows spectra from a 32-channel AWG in Embodiment 1.
Figure 6:
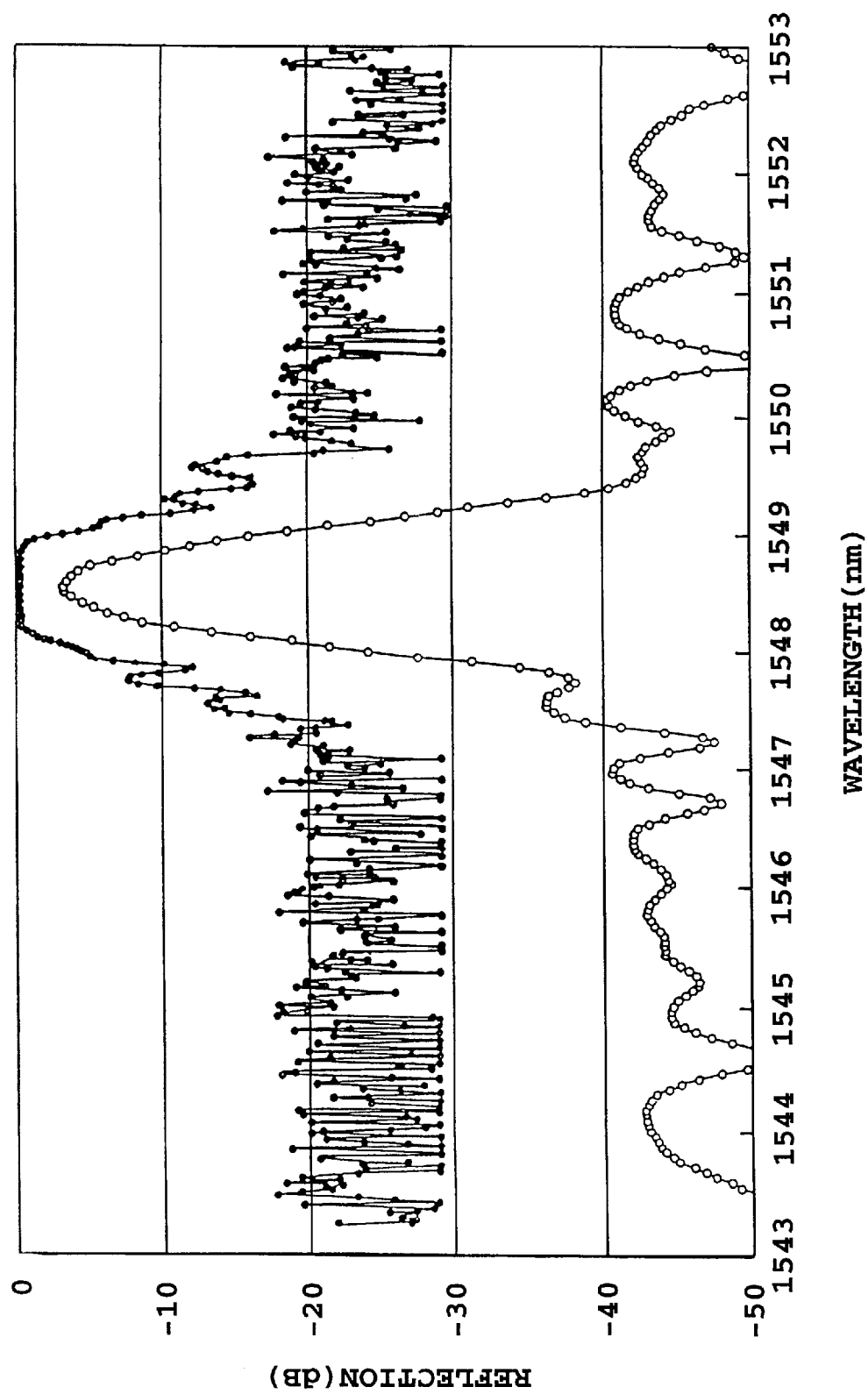
FIG. 6 shows spectra of one channel (No. 24) of a DC+BG device in Embodiment 1.
Figure 7:
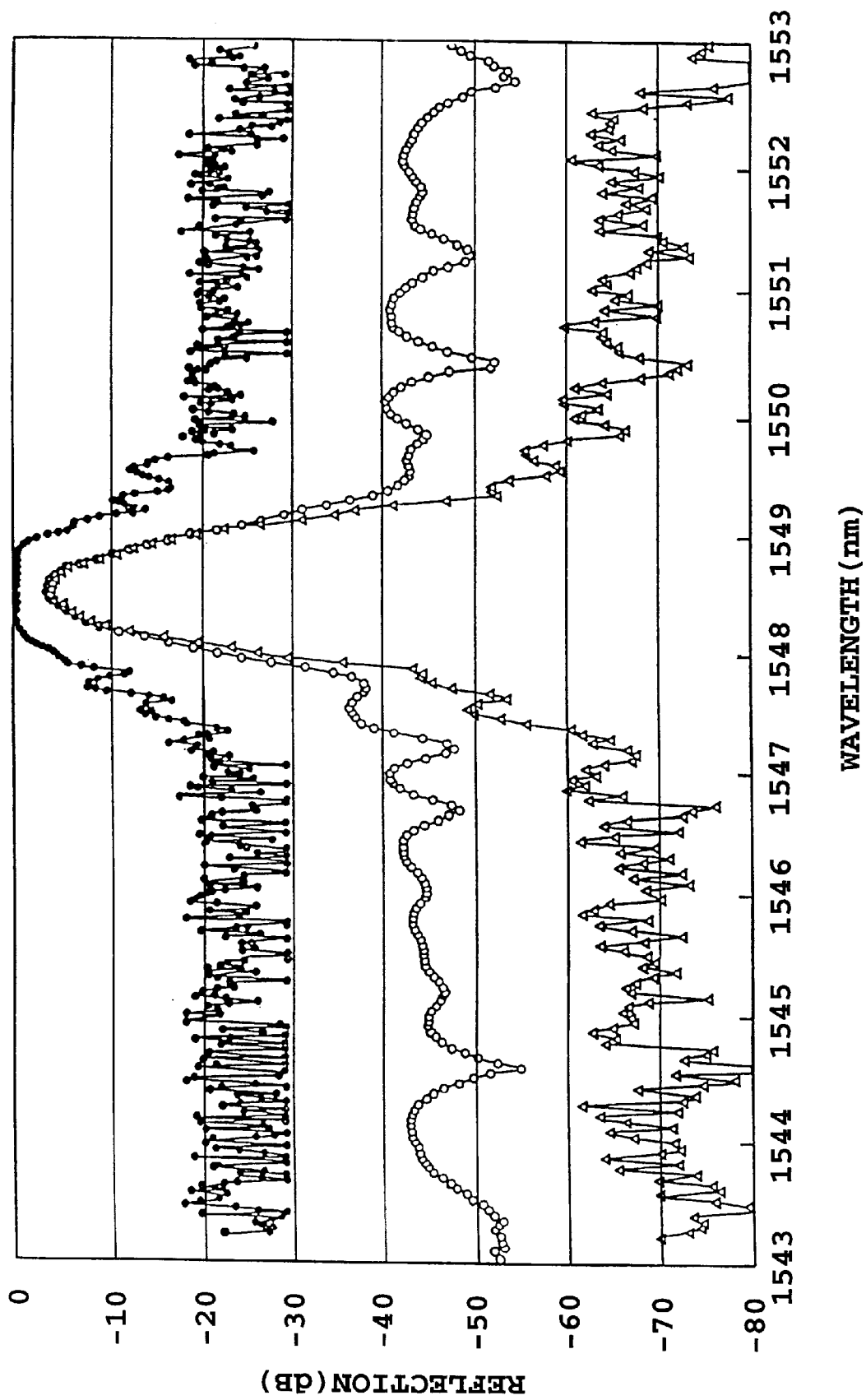
FIG. 7 shows spectra of the one channel (No. 24) in Embodiment 1.

Spectra from each of the devices produced were measured using an optical spectrum analyzer and a wide-wavelength light source. FIGS. 5 to 7 show spectra obtained through the measurements.

FIG. 5 shows spectra of the 32 channels of the AWG produced. In this 32-channel AWG, the operating wavelengths were adjusted by using an ITU grid and regulating the temperature of the TE cooler element.

FIG. 6 shows a spectrum (in the figure, the solid circles) from a DC+BG DEVICE corresponding to one of the 32 channels, in this case, channel No. 24, as well as a spectrum (in the figure, the open circles) of channel No. 24 of the AWG. The two spectra indicate that their wavelengths are equal. This is because the wavelength of the BG can be accurately controlled by uniform UV irradiation.

FIG. 7 shows a spectrum (in the figure, the open triangles) of channel No. 24 of the entire device according to this embodiment produced by connecting both modules together, the spectrum consisting a superposition of the above two spectra in FIG. 6. The spectrum (in the figure, the open circles) of the AWG and the spectrum (in the figure, the solid circles) from the DC+BG DEVICE both corresponding to channel No. 24 are also shown in the figure.

FIG. 7 shows that crosstalk is 50 dB or more, indicating that the crosstalk characteristic was substantially improved compared to the conventional AWGs.

In addition, the isolator integrated into the input-side fiber to prevent reflection reduced a reflected light returning to the input side down to 50 dB or less.

Thus, the effects of the present invention have been ascertained.

In addition, the DC+BG DEVICE used in this embodiment has the following advantages:

1) A typical problem of the DC+BG DEVICE is reflection to the input port. This reflection occurs because the amount of reflection depends on the coupling rate in the DC. If the coupling rate decreases by 1% down to 49%, the reflection rate increases up to 20 dB. Thus, to use a DC+BG device with a large umber of DCs and BGs connected together, reflection must be reduced. According to the present invention, the use of the single isolator on the input side of the AWG can solve this reflection problem.

2) If the DC+BG device is used as a single filter, the wavelength and the bandwidth must be precisely set, resulting in rigid production conditions. If, however, the DC+BG device is combined with the AWG and used as a second filter, a large bandwidth can be set to reduce the required wavelength adjustment accuracy. Despite its small effect on a reduction in crosstalk to adjacent channels, a large bandwidth has a sufficient effect on a reduction in crosstalk to the other channels. With a large number of channels, this crosstalk reduction effect makes a large contribution. Consequently, the required production accuracy can be reduced to enable devices with a large number of DCs and BGs connected together to be efficiently produced.

[Embodiment 2 (AWG+Two-Staged Grating, Integration Type)]

Figure 8:
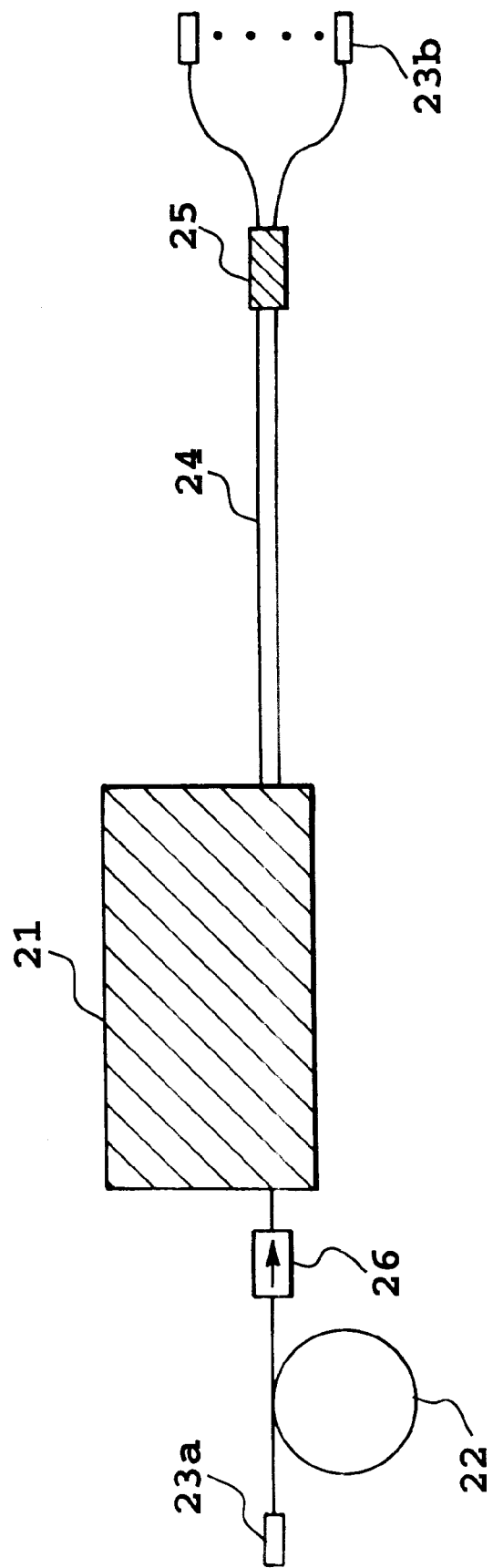
FIG. 8 is a configuration diagram showing Embodiment 2 of a wavelength division multiplexing filter according to the present invention.

Embodiment 2 shows an example in which a 16-channel AWG and a two-staged DC+BG device are combined together to produce an optical device in order to implement a PLC DWDM filter with an improved crosstalk characteristic. FIG. 8 shows a general configuration.

In FIG. 8, 21 is a module comprised of a chip placed in a case and obtained by integrating a 1×16 AWG and a two-staged DC+BG device together; 22 is an input-side fiber; 23*a* and 23*b* are connectors; 24 is an 8-fiber ribbon (actually, two 8-fiber ribbons); 25 is a branch section; and 26 is an isolator. The module 21 has a PLC chip packaged therein and having an optical fiber connected thereto. As in Embodiment 1, this embodiment has the isolator integrated into the input-side fiber 22 to prevent reflection.

Figure 9B:
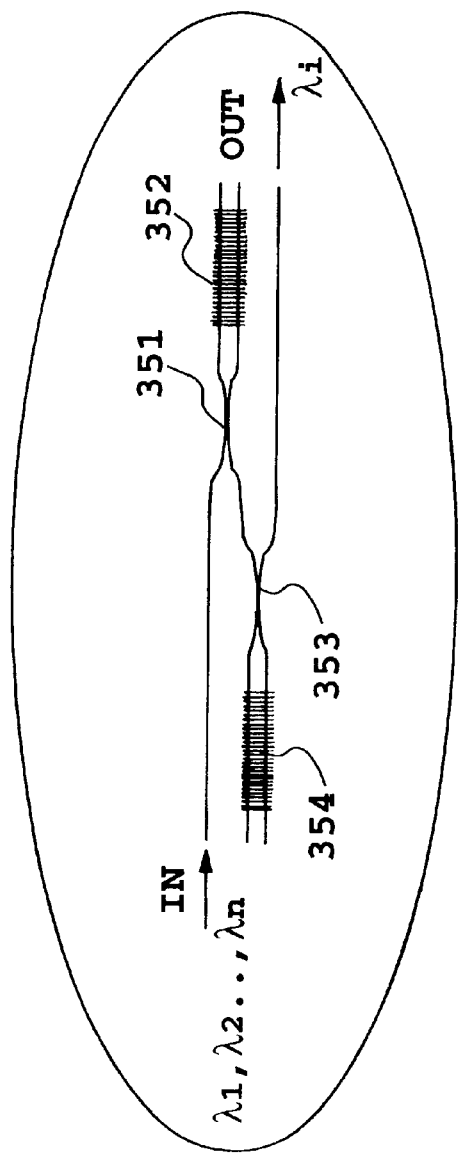
FIG. 9 is a detailed configuration diagram of a PLC chip according to Embodiment 2 of the present invention.
Figure 9A:
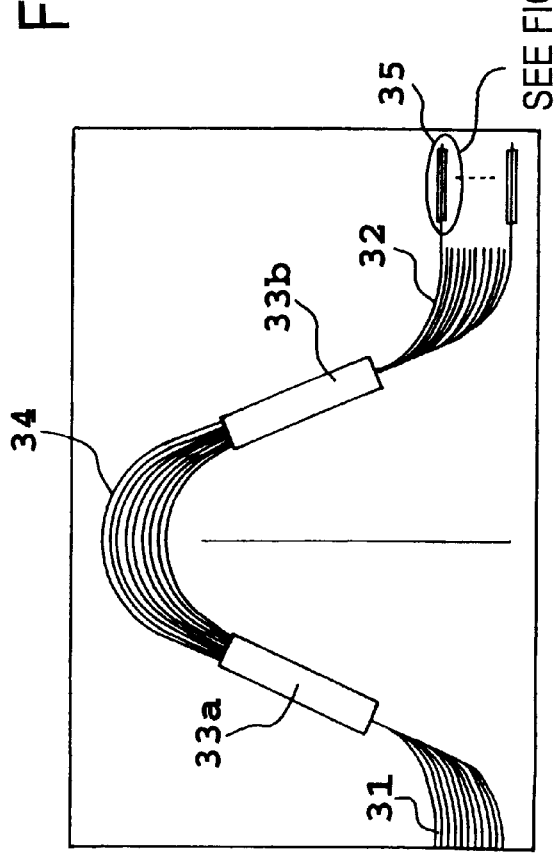

FIG. 9 shows a detailed configuration of the PLC chip. In this figure, 31 is a plurality of, in this case, 16 input waveguides; 32 is also 16 output waveguides; 33*a*, 33*b* are a pair of slab waveguides; 34 is a waveguide array consisting of a large number of waveguides having different lengths; and 35 is a grating section.

The grating section 35 constitutes a second filter comprised of a circuit comprising a DC 351 and a BG 352 combined together and a circuit comprising a DC 353 and a BG 354 combined together, the circuits being connected together, as shown in FIG. 9 in an enlarged view. Sixteen such filters are identical in number to the output waveguides of the 1×16 AWG (a first filter) comprised of the input waveguide 31, the output waveguide 32, the slab waveguides 33*a*, 33*b*, and the waveguide array 34, and are integrated on one chip together with the AWG (the integrated PLC chip has an input and output fibers connected thereto and is placed in the case as a module).

Thus, the two-staged DC+BG device improves the crosstalk characteristic compared to the single-staged DC+BG device. Another advantage of this structure is that it is suited for integration because the output direction is opposed to the input side. As in Embodiment 1, the wavelengths in the 16 BGs in the grating section 35 are shifted from one another so as to correspond to each of the output waveguides of the AWG.

The silica-based-glass waveguide constituting the optical device in FIG. 9 was produced using a method similar to that in Embodiment 1, and the substrate was comprised of Si of a thickness 1 mm. The core of the silica-based-glass was 6×6 µm, Δ~0.75%, and the chip size was 60×50 mm.

The production conditions and parameters of each device are listed below:

AWG
  Wavelength interval: 100 GHz
  Number of channels: 16
Bragg grating
  UV laser: excimer ArF
  Production method: phase mask method
  Irradiation intensity: ~100 J/cm$^2$
  Irradiation time: 10 minutes
  Grating length: 10 mm Spectra from each of the devices produced were measured using an optical spectrum analyzer and a wide-wavelength light source. The crosstalk was measured at 60 dB or more, indicating that the crosstalk characteristic was further improved compared to the conventional AWGS.

Thus, the effects of the present invention have been ascertained.

[Embodiment 3 (AWG+Two-Staged Chirping Grating, Integration Type)]

Embodiment 3 shows an example in which a 16-channel AWG and two chirping gratings (CGs) are combined together to produce an optical device in order to implement a planar lightguide circuit DWDM filter with an improved crosstalk characteristic. FIG. 10 shows a detailed configuration of a PLC chip in the planar lightguide circuit DWDM filter (the configuration of the entire device is similar to that in Embodiment 2, as shown in FIG. 8 except that the module 21 is replaced with the chip in this example).

In FIG. 10, 41 is a plurality of, in this case, 16 input waveguides; 42 is also 16 output waveguides; 43a and 43b are a pair of slab waveguides; 44 is a waveguide array consisting of a large number of waveguides having different lengths; and 45 is a grating section.

The grating section 45 constitutes a second filter; it is comprised of two chirping gratings (CGs) 451, 452 each connected to a corresponding one of the output waveguides 42 of the 1×16 AWG (a first filter) consisting of the input wave guides 41, the output waveguides 42, the slab waveguides 43a, 43b, and the waveguide array 44, and is integrated on one chip together with the AWG, as shown in FIG. 10 in an enlarged view (the integrated PLC chip has an input and output fibers connected thereto and is placed in the case as a module).

The two chirping gratings (CGs) 451, 452 have different reflected wavelength domains, and the boundary domain between these wavelength domains is set to be the wavelength of a corresponding channel. As in Embodiment 1, the wavelengths in the 16 CGs 451 and 16 CGs 452 in the grating section 45 are shifted from one another so as to correspond to each of the output waveguides of the AWG.

As shown in FIG. 10, the PLC chip according to this embodiment, the crosstalk characteristic is improved by forming, after the AWG, the two CGs having different reflected wavelength domains. In addition, the CGs can form wide reflection bands to stop the wavelengths other than that of the signal light at each port. In addition, the low intensity of the signal light reflected from the CGs prevents reflection at the input ports.

The silica-based-glass waveguide constituting the optical device in FIG. 10 was produced using a method similar to that in Embodiment 1, and the substrate was comprised of Si of a thickness 1 mm. The core of the silica-based-glass was 4×5 µm, Δ~1.5%, and the chip size was 40×50 mm.

Figure 11:
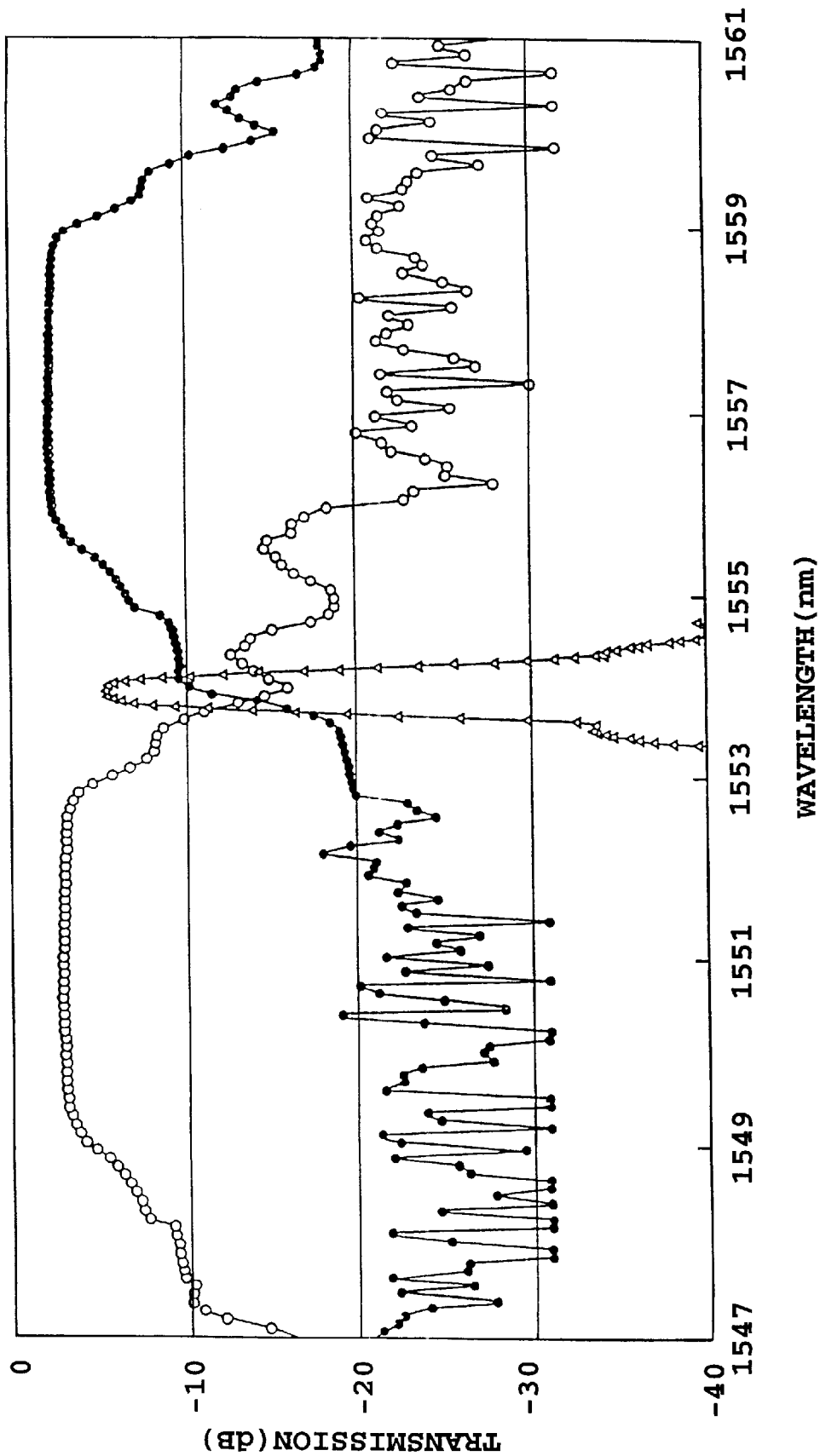
FIG. 11 shows spectra from a grating and an AWG according to Embodiment 3.

The production conditions and parameters of each device are listed below:

AWG
  Wavelength interval: 50 GHz
  Number of channels: 16
Grating
  Produced by an etching process
  Pitch: about 1.6 µm
  Single grating length: 15 mm Spectra from each of the devices produced were measured using an optical spectrum analyzer and a wide-wavelength light source. FIG. 11 shows spectra obtained through the measurements. In the figure, the open circles indicate a spectrum from the CG 451 corresponding to one of the 16 channels, the solid circles indicate a spectrum from the CG 452 corresponding to the same channel, and the open triangles indicate a spectrum of the same channel of the entire device according to this embodiment.

FIG. 11 shows that crosstalk is 60 dB or more, indicating that the crosstalk characteristic was further improved compared to the conventional AWGs.

Thus, the effects of the present invention have been ascertained.

[Embodiment 4 (AWG+AWG, Separation Type)]

Figure 12:
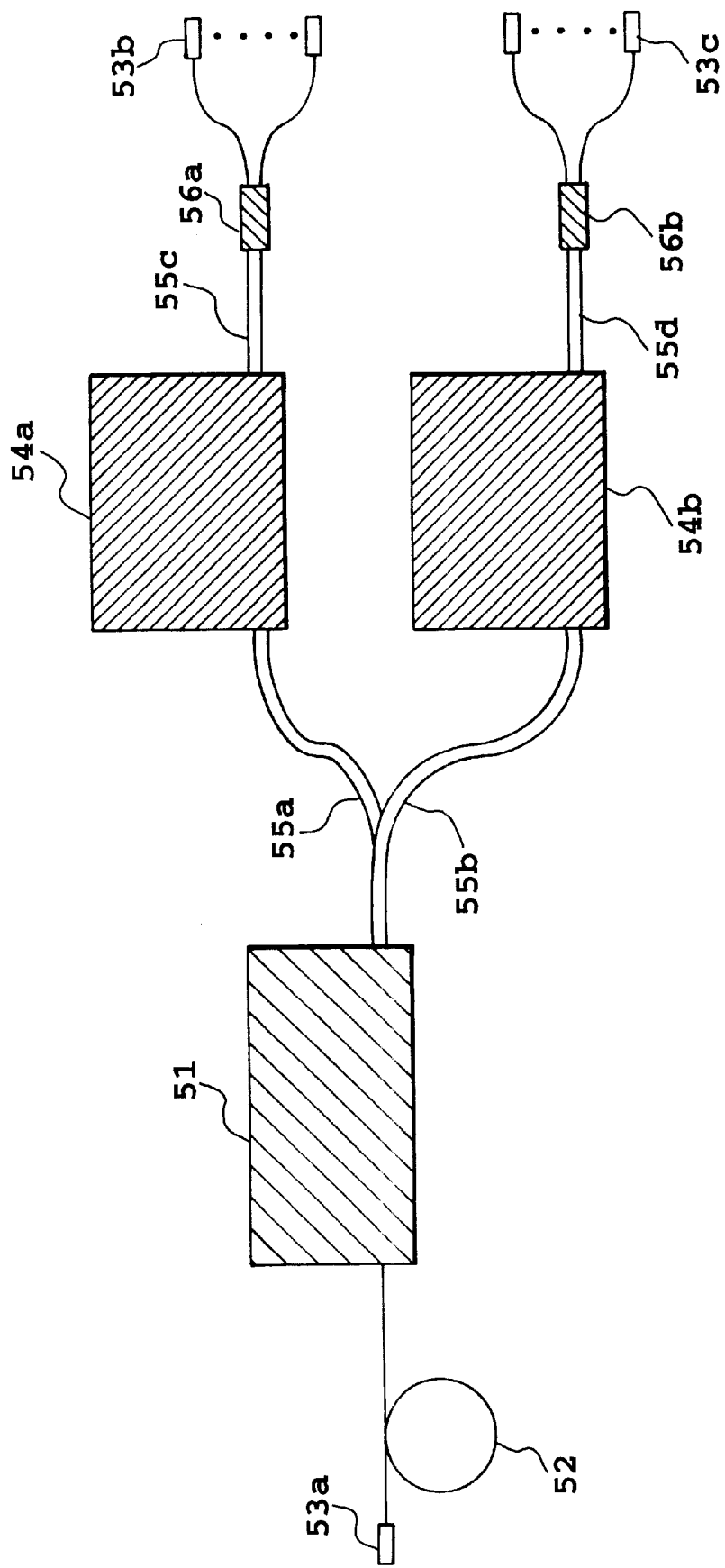
FIG. 12 is a configuration diagram showing Embodiment 4 of a wavelength division multiplexing filter according to the present invention.

Embodiment 4 shows an example in which two AWGs were combined together to produce an optical device in order to implement a PLC DWDM filter. FIG. 12 shows a general configuration.

In FIG. 12, 51 is a first module comprised of a 1×32 AWG chip placed in a case; 52 is an input-side fiber; 53a, 53b, and 53c are connectors; 54a and 54b are second modules; 55a, 55b, 55c, and 55d are 8-fiber ribbon (actually, two 8-fiber ribbons); and 56a and 56b are 8-fiber ribbon branching sections.

Figure 13:
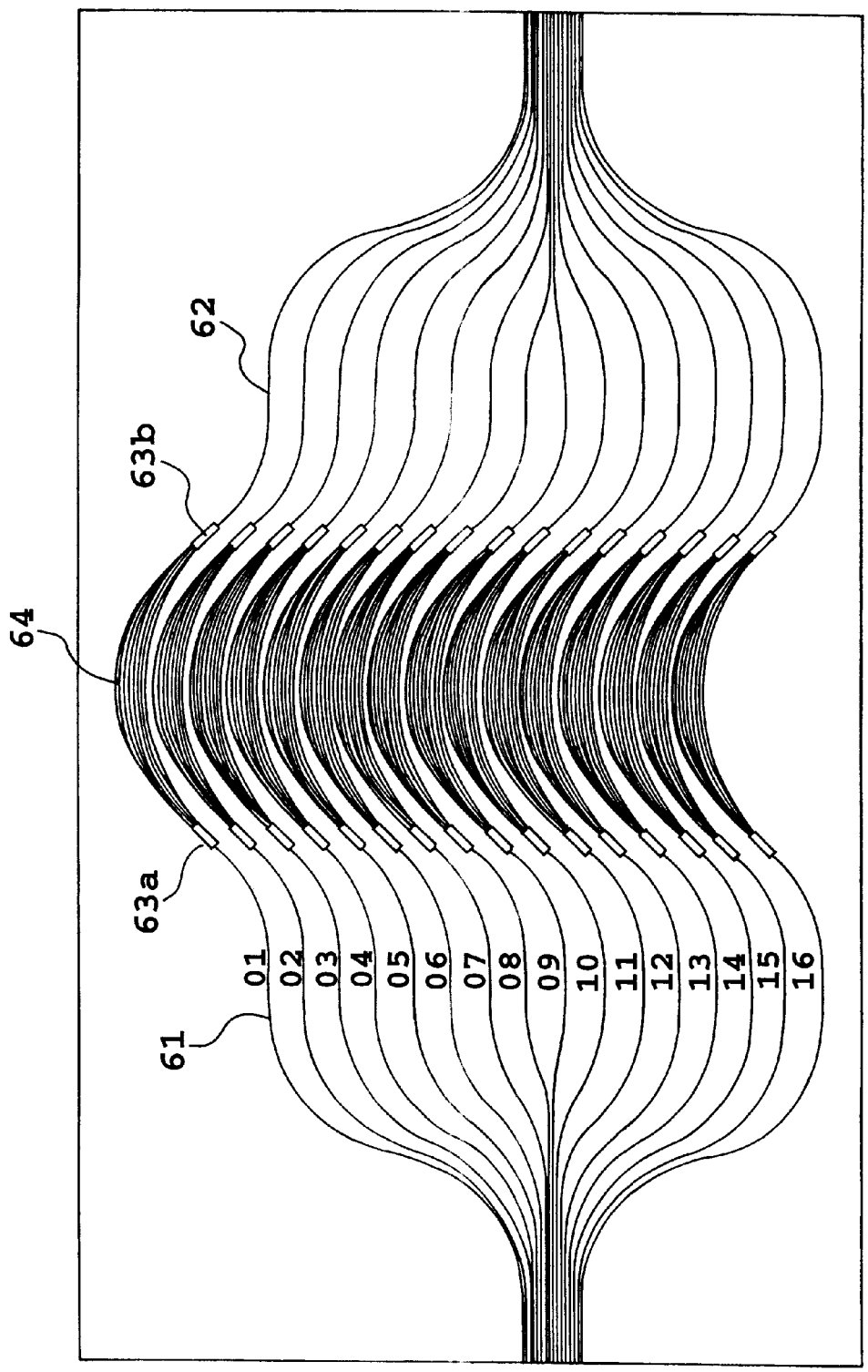
FIG. 13 is a detailed configuration diagram of a second AWG according to Embodiment 4 of the present invention.

The second modules 54a, 54b constitute a second filter comprised of a chip placed in a case and produced by connecting 16 AWGs together, the number of which equals to half the output ports of the first module (the first filter) 51. FIG. 13 shows a detailed configuration of one the second modules.

In FIG. 13, 61 is input waveguides; 62 is output waveguides; 63a and 63b are a pair of slab waveguides; and 64 is a waveguide array consisting of a large number of waveguides having different lengths. For each of the above components, 16 waveguides are provided so as to correspond to the 16 channels.

In this case, the one input waveguide and the one output waveguide are used to reduce the size of the device, thereby enabling the arrayed AWG to be integrated on the single substrate and providing a high wavelength uniformity. In addition, as in Embodiment 1, the wavelengths in the 32 AWGs in the second modules 54a, 54b are shifted from one another so as to correspond to each of the output waveguides of the first AWG.

According to this embodiment, the module 51 was connected to each of the two modules 54a, 54b via two corresponding 8-fiber ribbons.

In this embodiment, Thermo-electric (TE) cooler elements were also used for the modules 51, 54a, 54b to stabilize the temperature of the PLC chips and thus the operating wavelengths.

In this embodiment, the optical device was also comprised of a silica-based-glass waveguide and produced in the same manner as in Embodiment 1.

The production conditions and parameters of each device are listed below:

First AWG
   Core: 6×6 μm, Δ~0.75%
   Wavelength interval: 100 GHz
   Number of channels: 32
   Chip size: 30×25 mm
Second AWG
   Core: 6×6 μm, Δ~0.75%
   Wavelength interval: 200 GHz
   Number of channels: 16
   Chip size: 50×25 mm In the second AWG, the center wavelengths of the individual AWGs may slightly deviate from set values due to production errors. These deviations, however, can be individually adjusted by irradiating the AWGs with UV laser beams.

Figure 14:
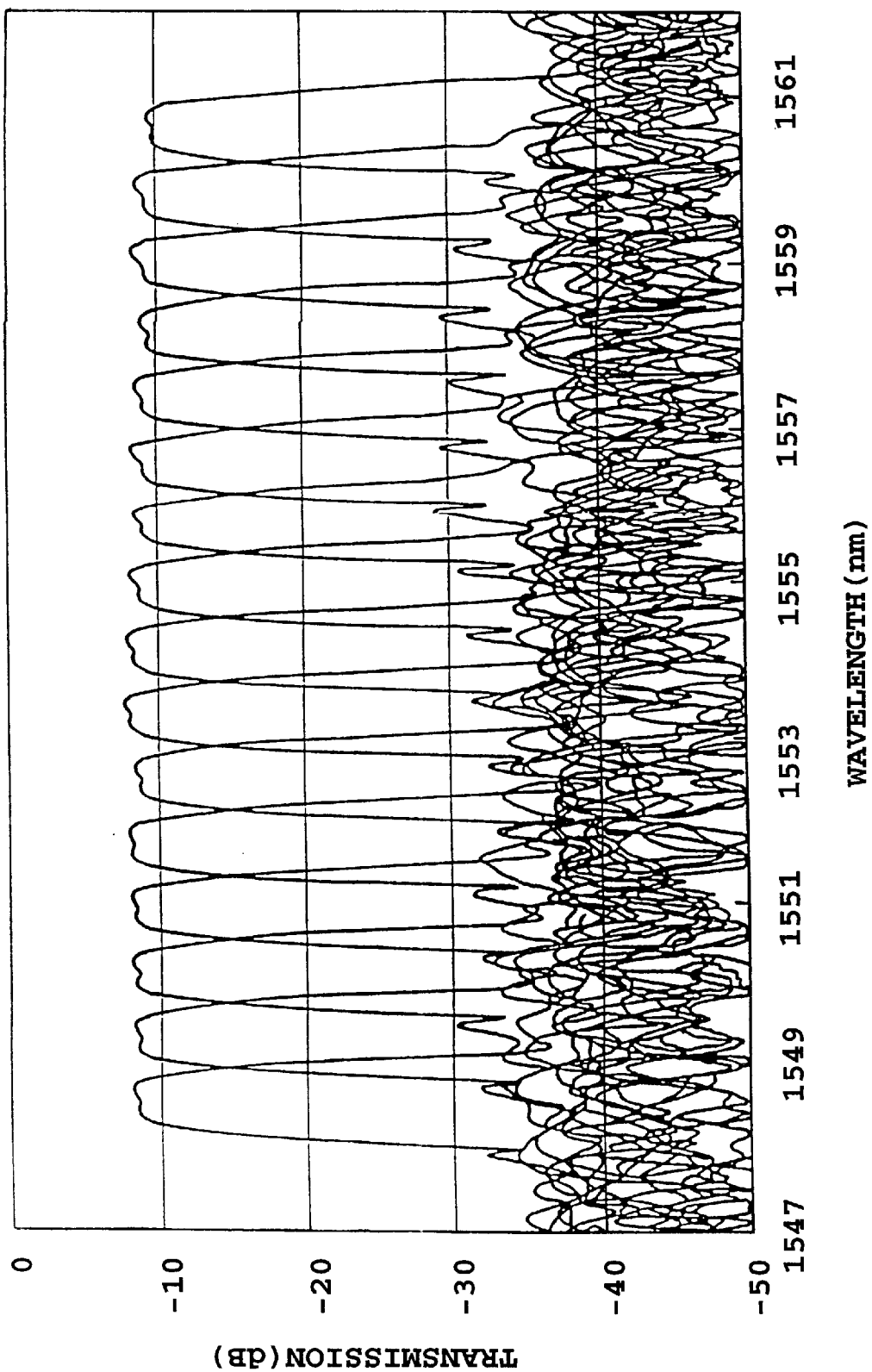
FIG. 14 shows spectra of 16 channels of a first AWG in Embodiment 4.
Figure 15:
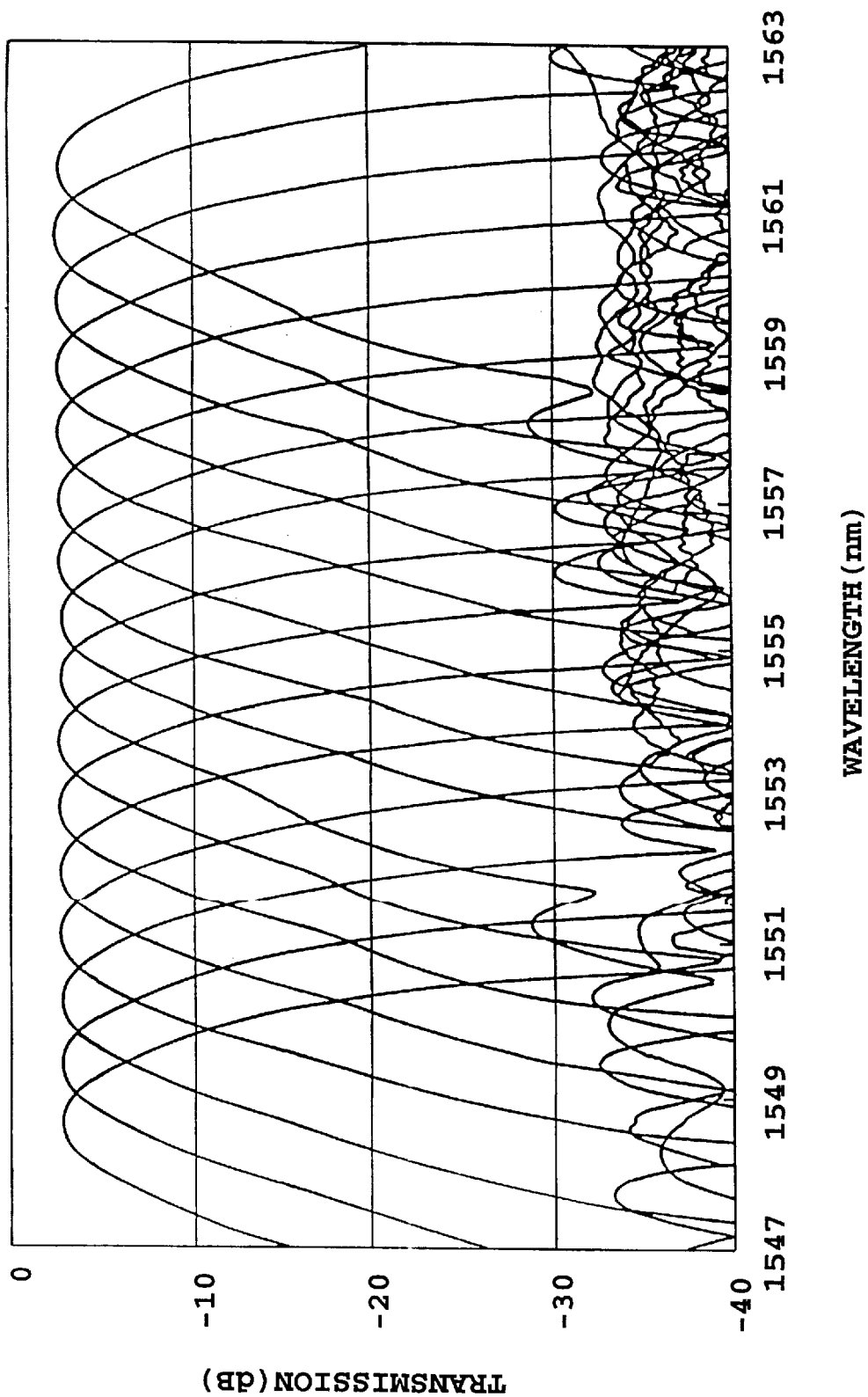
FIG. 15 shows spectra of 16 channels of a second AWG in Embodiment 4.
Figure 16:
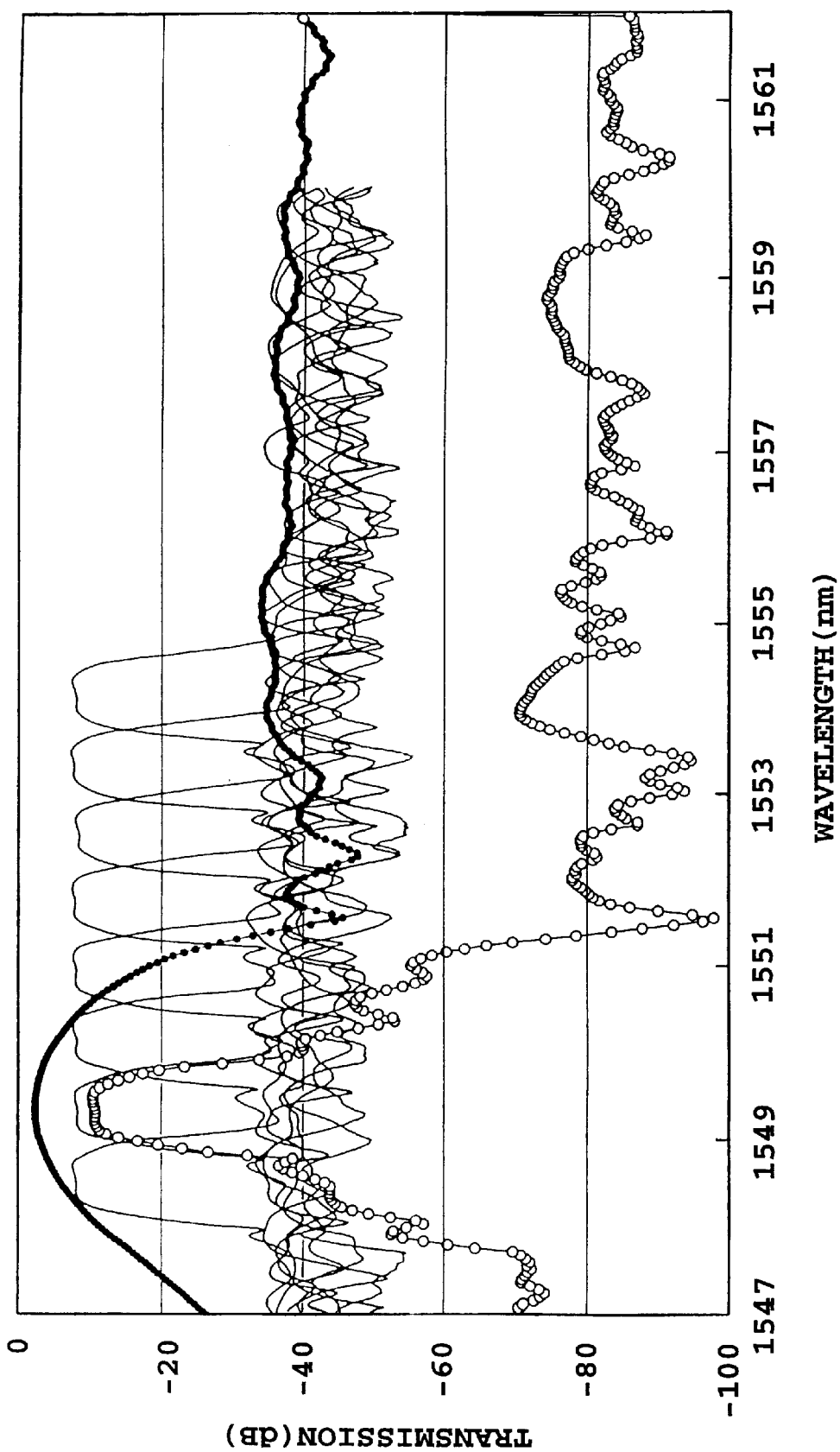
FIG. 16 shows spectra of one channel according to Embodiment 4.

Spectra from each of the devices produced were measured using an optical spectrum analyzer and a wide-wavelength light source. FIGS. 14 to 16 show spectra obtained through the measurements.

FIG. 14 shows spectra of 16 channels on a longer-wavelength side of the first AWG, and FIG. 15 shows spectra of 16 channels on a longer-wavelength side of the second AWG.

FIG. 16 shows a spectrum (in the figure, the open circles) of one channel of the entire device according to the present invention produced by connecting the two AWGs together, wherein the spectrum corresponds to a superposition of the above two spectra. This figure also shows a spectrum (in the figure, the solid line) of eight channels of the first AWG and a spectrum (in the figure, the solid circles) of one channel of the second AWG.

FIG. 16 indicates that the crosstalk characteristic was substantially improved compared to the conventional AWGs.

Wavelength characteristics were determined from the spectra obtained through the measurements. The table below shows characteristics exhibited in each case.

| No. | Item | One connection | two connection |
|---|---|---|---|
| 1 | Insertion loss (dB) | 8.0 | 10.5 |
| 2 | 3-dB bandwidth (nm) | 0.63 | 0.61 |
| 3 | Adjacent crosstalk (dB) | 24.8 | 30.4 |
| 4 | Non-adjacent crosstalk (dB) | 27.4 | 47.2 |

Based on the above Table, by setting the bandwidth in the second AWG at a sufficiently large value, the adverse effects on the bandwidth in the first AWG can be reduced despite an increase in insertion loss by about 2 to 3 dB. In addition, the adjacent and non-adjacent crosstalk characteristics can be significantly improved.

In addition, although this embodiment connects the first 1×32 AWG and the second arrayed AWG together via the optical fibers, two second arrayed AWG chips may be integrated on one chip so that the first AWG can be connected to the PLC chips. Alternatively, all the PLC chips may be integrated on one chip.

Thus, the effects of the present invention have been ascertained.

[Embodiment 5 (AWG+Interference Film Filter)]

Planar lightguide circuits each comprised of a 32-channel AWG and an interference film filter both inserted into a waveguide were combined together to implement a PLC WDM filter with an improved crosstalk characteristic.

Figure 17B:
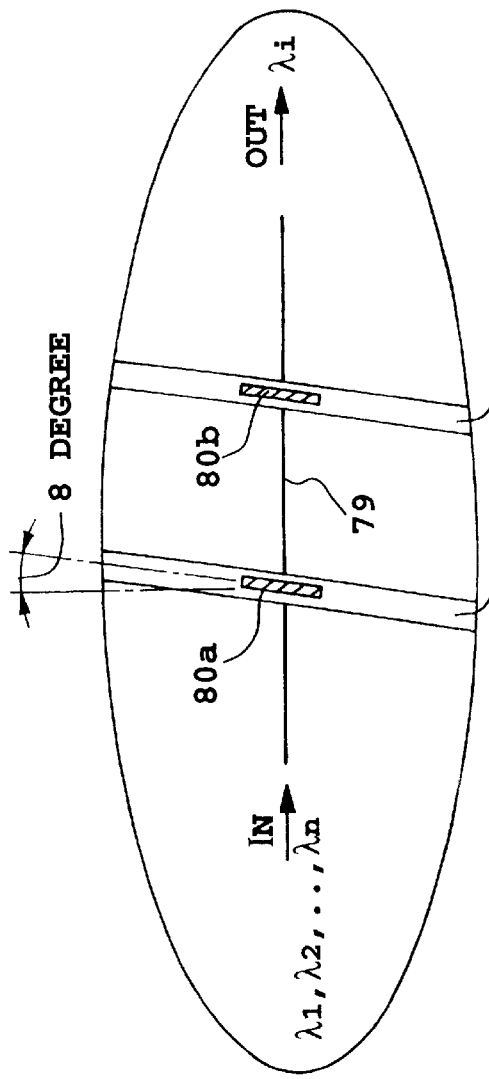
FIG. 17 shows a configuration diagram of a WDM filter produced according to Embodiment 5 of the present invention.
Figure 17A:
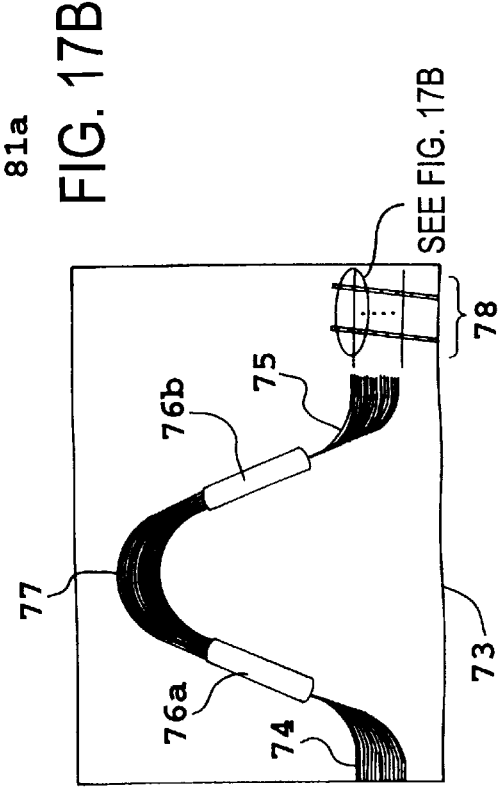

According to this embodiment, the first WDM filter was principally comprised of silica-based-glass waveguides. FIG. 17 shows a general configuration of this filter and an enlarged view of the interference film filter section. In this figure, 73 is a Si substrate; 74 is input waveguides; 75 is output waveguides; 76a and 76b are slab waveguides; 77 is an arrayed waveguide; 78 is a second filter section; 79 is a waveguide; 80a and 80b are interference film filters inserted into corresponding grooves; and 81a and 81b are grooves formed in the lightguide circuit.

The silica-based-glass waveguide constituting the WDM filter in FIG. 17 was produced by means of normal flame hydrolysis deposition (FHD), photolithography, and reactive etching, and the substrate was formed of Si of a thickness 1 mm. The core size of the waveguide was 6×6 μm, Δ~0.75%. The entire glass layer including clad layers formed on and under the Si substrate was about 50 μm in thickness.

An AWG (a first filter) comprised of the arrayed waveguides 74 to 77 in FIG. 17 had a wavelength interval of 100 GHz and had 32 channels. Its center wavelength was adjusted using an ITU-TS (International Telecommunication Union-Telecommunication Standardization Sector) grid. The chip size of the planar lightguide circuit in FIG. 17 was 30×35 mm.

To construct a second filter, the interference film filters were inserted into the grooves 81a, 81b, as shown in FIG. 17. The inserted interference film filters 80a, 80b were sharp cut filters for longer-wavelength pass (high pass) and shorter-wavelength pass (low pass) having a size of about 1.5×1.0 mm and a thickness of about 20 μm. The grooves were formed by means of dicing saw machining using a thin blade. The grooves were about 25 μm in width and about 200 μm in depth, and the angle between the center lines of the waveguide and the groove was set at 8° in order to prevent reflection. In addition, the interference film filters 80a, 80b were fixed in the grooves using an UV-curable adhesive.

The 32 output waveguides of the AWG (the first filter) had different interference film filters with corresponding cut wavelengths inserted in the corresponding grooves. Accordingly, each output port transmitted a desired wavelength therethrough, while blocking the other wavelengths.

A typical connection method and a UV adhesive were used to connect one fiber to the input of the PLC WDM filter while connecting 32 fibers to the output thereof.

Spectra from the PLC WDM with the fibers connected thereto were measured using an optical spectrum analyzer and a wide-wavelength light source. During the measurements, Thermo-electric (TE) cooler elements were used to stabilize the temperature of the Si substrate and thus the operating wavelengths in the AWG.

Figure 18:
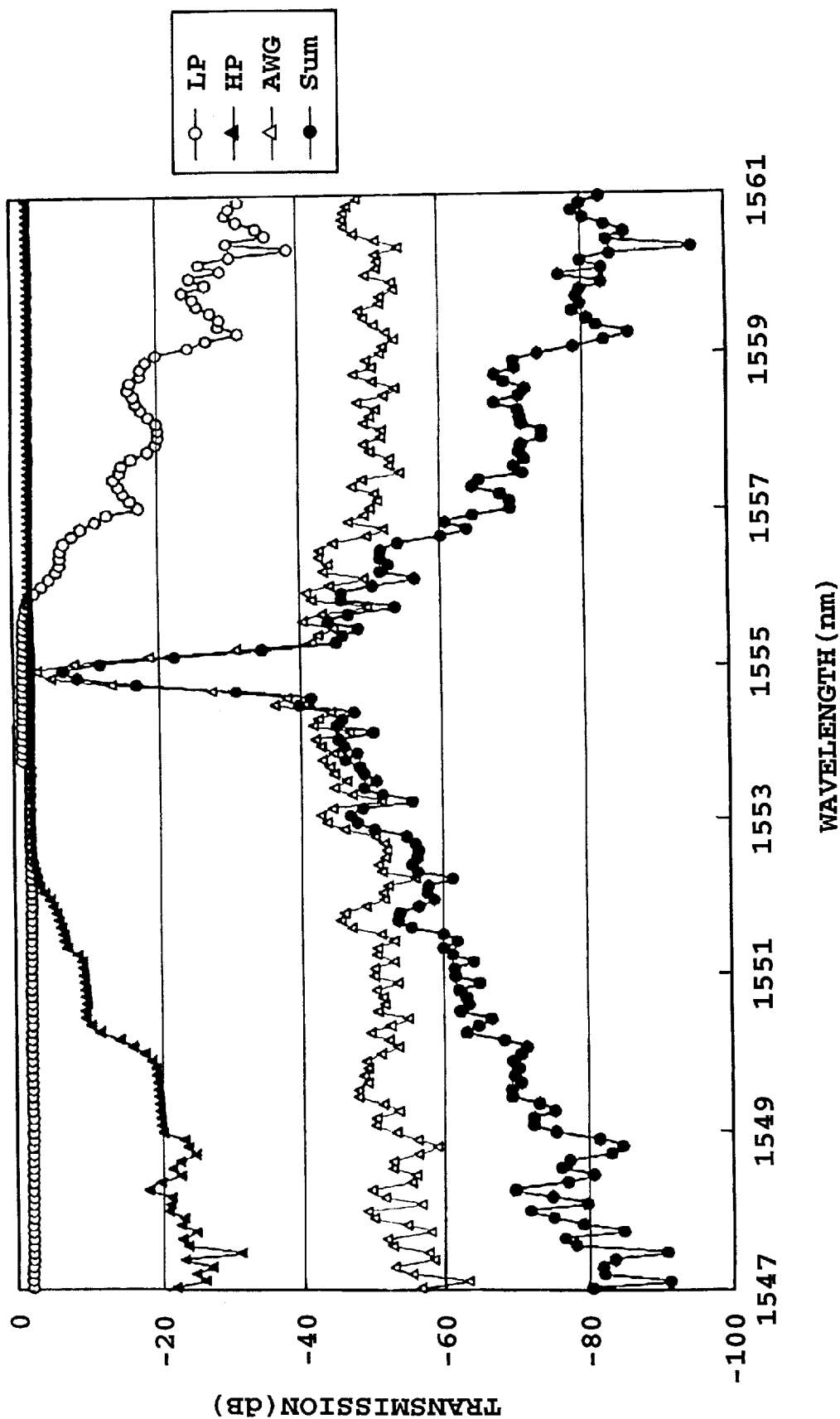
FIG. 18 shows spectra of a central channel (No.17) of the WDM filter produced according to Embodiment 5 of the present invention.

FIG. 18 shows spectra of a center channel (No. 17) of the WDM filter produced according to this embodiment. In this figure, the open circles indicate a spectrum of the lowpass interference film filter inserted into the waveguide; the solid circles indicate a spectrum of the highpass interference film filter inserted into the waveguide; the open triangles indicate a spectrum from the AWG, the first filter; and the solid triangles indicate a spectrum from the entire WDM filter produced according to this embodiment, the spectrum being equivalent to the sum of the above three spectra.

FIG. 18 shows that the spectrum from the WDM filter produced according to this embodiment has a substantially improved crosstalk characteristic, that is, −50 dB or less, except for the peak at the center of the spectrum. Thus, the crosstalk characteristic was substantially improved compared to the conventional AWGs.

Consequently, the effects of the present invention have been ascertained.

[Embodiment 6 (AWG+AWG, Another Example of the Separation Type)]

Figure 19:
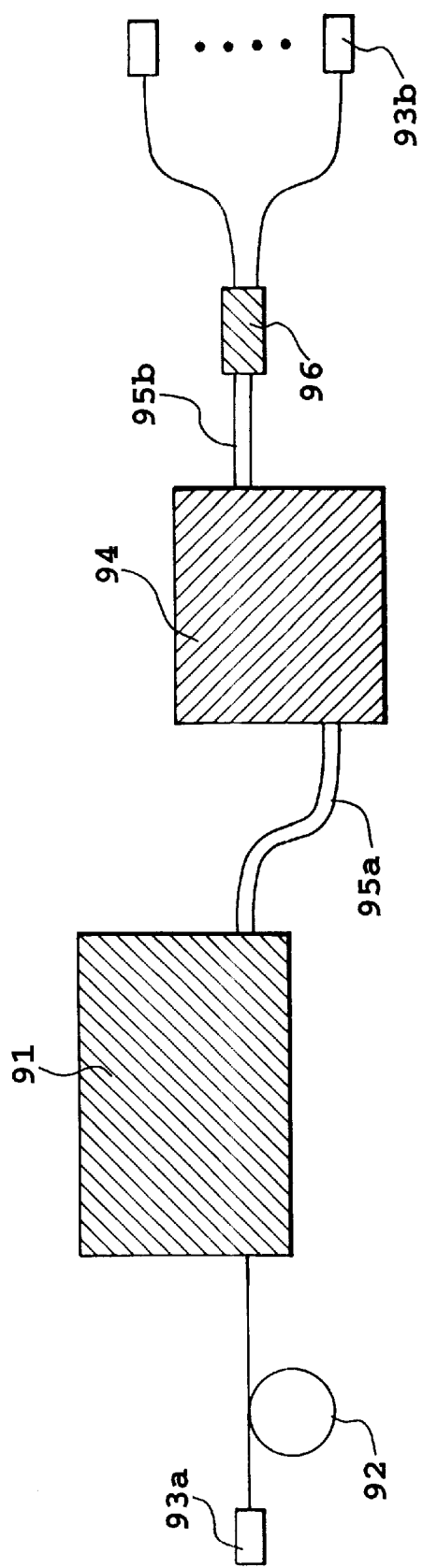
FIG. 19 is a configuration diagram showing Embodiment 6 of a wavelength division multiplexing filter according to the present invention.

Embodiment 6 is an example in which AWGs similar to those in Embodiment 4 were combined in two stages to form an optical device in such a manner that the second-stage AWGs were arranged on the substrate in both the longitudinal and lateral directions thereof, thereby implementing a planar lightguide circuit DWDM filter with a smaller circuit and an improved crosstalk characteristic. FIG. 19 shows a general configuration.

In FIG. 19, 91 is a first WDM filter module comprised of a 1×32 AWG chip placed in a case; 92 is an input-side one-core fiber; 93a, 93b, and 93c are connectors; 94 is a second filter module; 95a and 95b are 8-fiber ribbons (actually, 95a and 95b each include four 8-fiber ribbons); and 96 is a fiber ribbon branch section.

The first module is identical to the first module 51 used in Embodiment 4.

Figure 20:
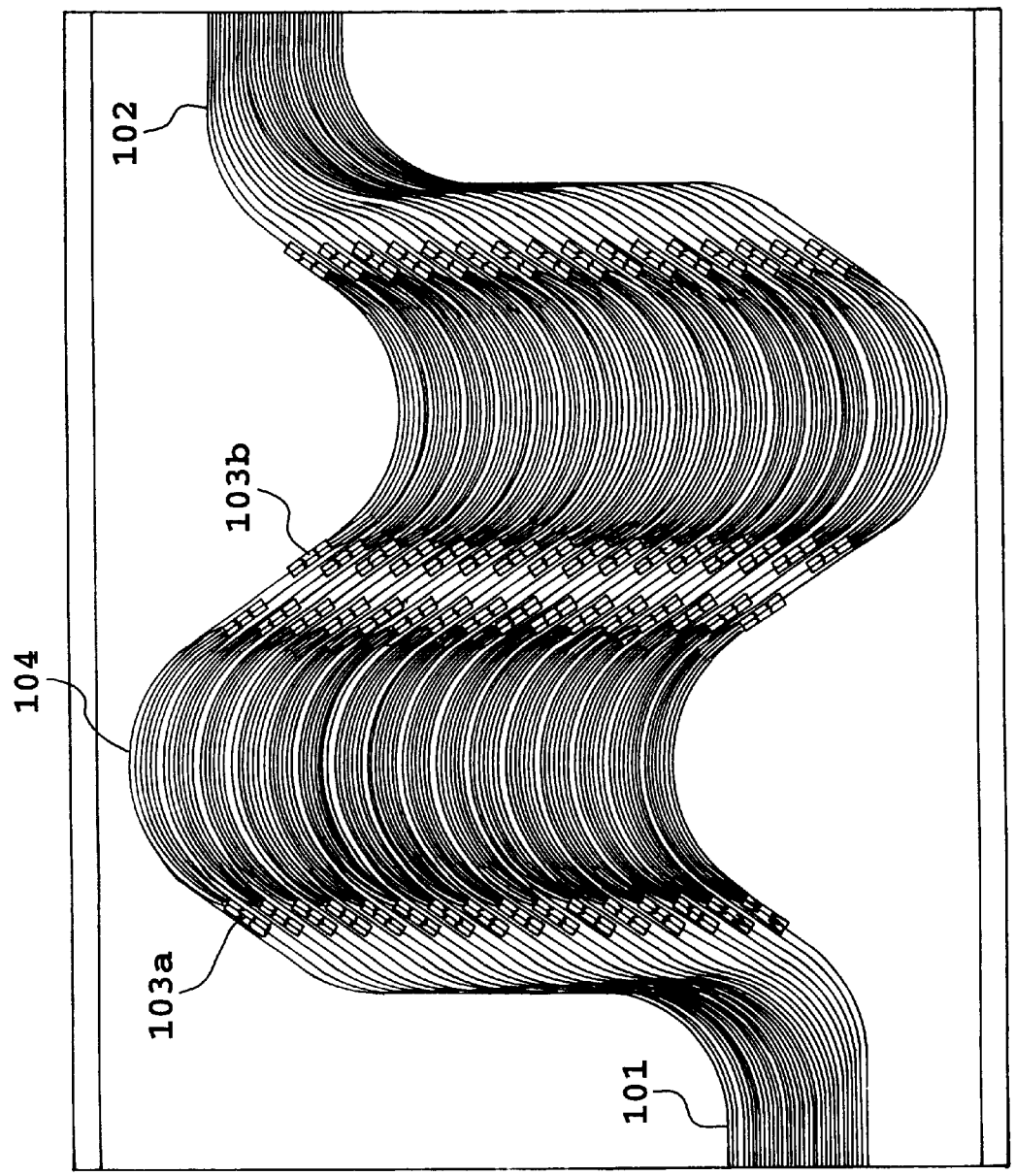
FIG. 20 is a detailed configuration diagram of a second arrayed AWG according to Embodiment 6 of the present invention.

The second module 94 constitutes a second filter comprised of a chip placed in a case and produced by connecting 32 AWGs together on a single substrate, the AWGs identical in number to the output ports of the first WDM filter module 91 (a first filter). FIG. 20 shows a detailed configuration of the second filter module.

In FIG. 20, 101 is input waveguides; 102 is output waveguides; 103a and 103b are a pair of slab waveguides; and 104 is a waveguide array consisting of a large number of waveguides having different lengths. For each of the above components, 32 waveguides are provided so as to correspond to the 32 channels. As in Embodiment 1, the operating wavelengths in the 32 AWGs are shifted from one another so as to correspond to each of the output waveguides of the first AWG.

The 32 AWGs are arranged on the single substrate by placing two lateral rows of 16 AWGs in the longitudinal direction of the substrate. In this arrangement method, the numbers of vertical and horizontal rows are not limited to those in this embodiment in FIG. 20, but M×N (M and N are natural numbers) AWGs can be arrayed by placing N lateral rows of M AWGs in the longitudinal direction. This arrangement method increases the degree of freedom of the design of the second arrayed AWG and enables the AWGs to be densely arrayed by selecting optical numbers for M and N depending on the design of the individual arrayed AWGs. Thus, this arrangement method can reduce the size of the second chip, integrate more AWGs on a single substrate, and make the wavelengths from the AWGs uniform.

In addition, according to this embodiment, the modules 91 and 94 were connected together via four 8-fiber ribbons.

In this embodiment, Thermo-electric (TE) cooler elements were also used for the modules 91 and 94 to stabilize the temperature of the PLC chips and thus the operating wavelengths.

In this embodiment, the optical device was also comprised of a silica-based-glass waveguide and produced in the same manner as in Embodiment 1.

The production conditions and parameters of the second arrayed AWG are listed below:

Core: 6×6 µm, Δ~0.75%

Wavelength interval: 200 GHz

Number of channels: 32

Chip size: 33.5×27.0 mm

Since the above arrangement method enabled the AWGs to be densely arranged, the second arrayed AWG realized a very small chip size despite the 32 AWGs arrayed on the single substrate.

In addition, in the second arrayed AWG, the center wavelengths of the individual AWGs may slightly deviate from set values due to production errors. These deviations, however, can be individually adjusted by irradiating the AWGs with UV laser beams.

Spectra from each of the devices produced were measured using an optical spectrum analyzer and a wide-wavelength light source. The first AWG was the same as the first AWG in Embodiment 4, and a spectrum of the 16 channels on the longer-wavelength side of this AWG is shown in FIGS. 14.

Figure 21:
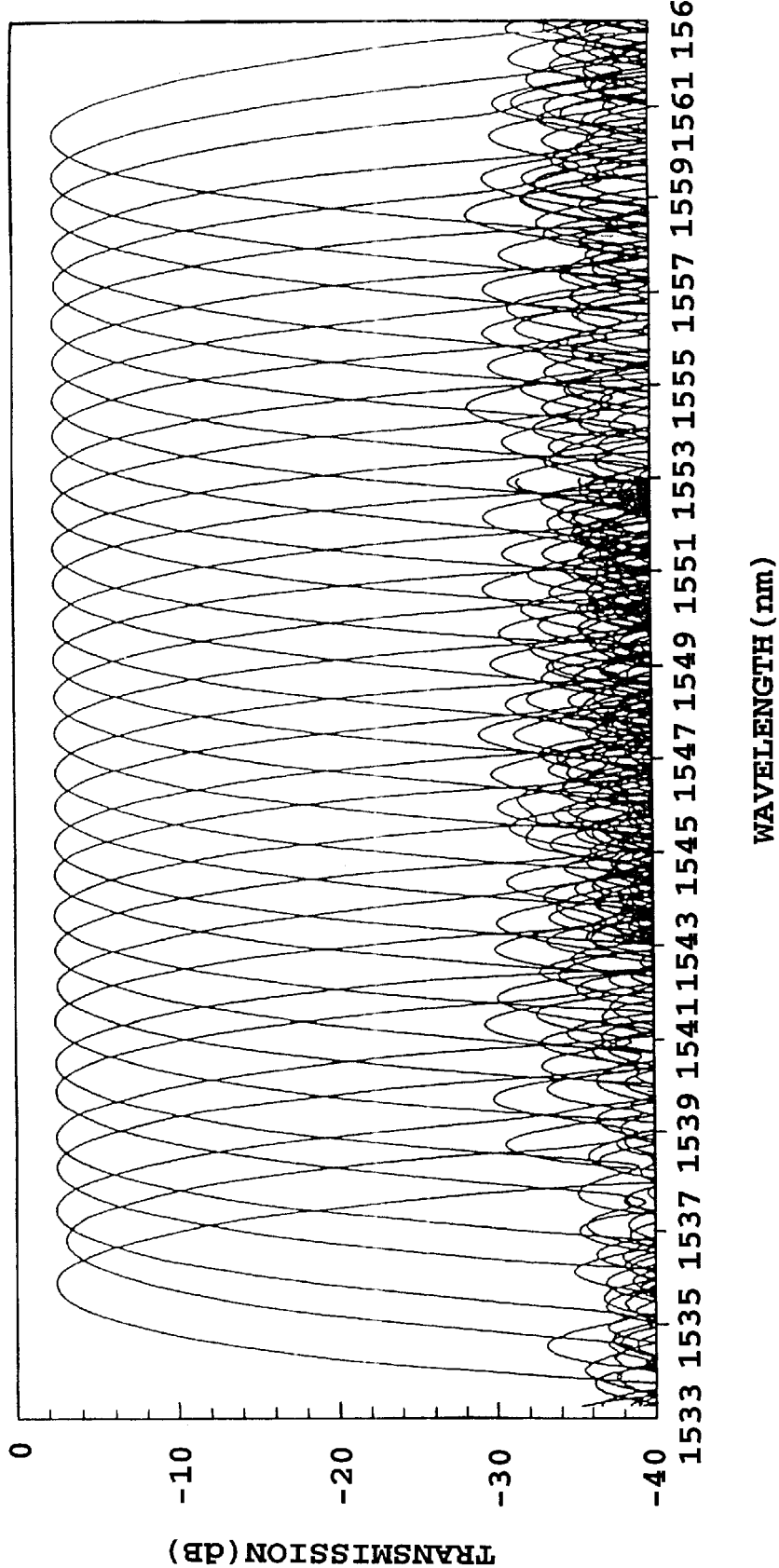
FIG. 21 shows spectra of 32 channels of the second arrayed AWG according to Embodiment 6 of the present invention.

FIG. 21 shows spectra of all the 32 channels of the second arrayed AWG. Despite the 32 AWGs densely arranged on the single substrate, the above arrangement method served to provide a spectral characteristic similar to that of the second AWG in Embodiment 4.

Figure 22:
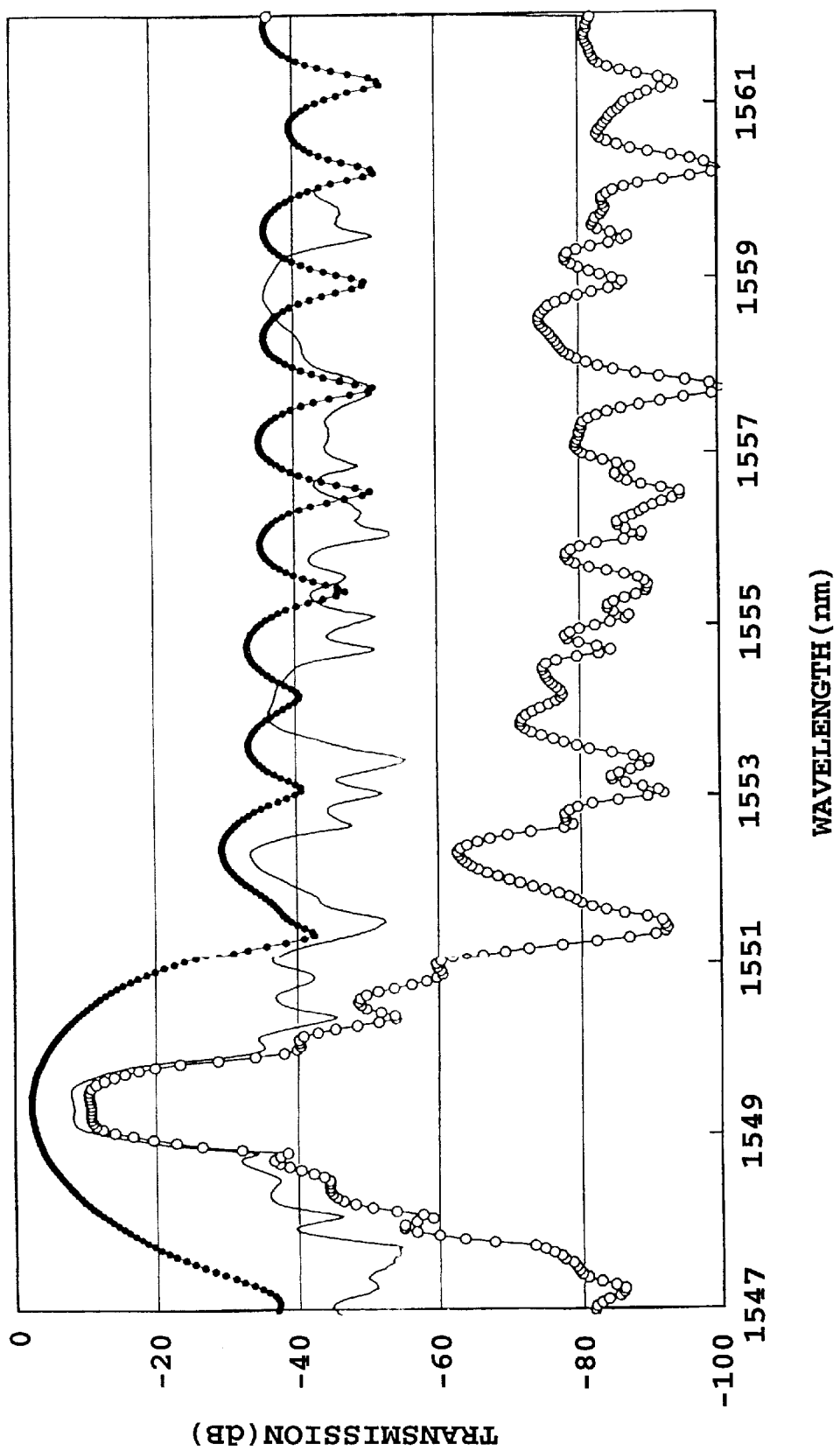
FIG. 22 shows spectra of one channel according to Embodiment 6 of the present invention.

FIG. 22 shows a spectrum (in the figure, the open circles) of one channel of the entire device according to the present invention produced by connecting the first and second modules together. This figure also shows a spectrum (in the figure, the solid line) of one channel of the first AWG and a spectrum (in the figure, the solid circles) of one channel of the second AWG.

FIG. 22 indicates that in this embodiment, the crosstalk characteristic was substantially improved compared to the conventional AWGs, as in Embodiment 4.

In addition, although this embodiment has connected the first 1×32 AWG and the second arrayed AWG together via the optical fibers, the first AWG chip and the second arrayed AWG chip, that is, the PLC chips can be connected together. A UV-curable adhesive is used for connections. Alternatively, all the PLC chips can be integrated on one chip.

In addition, in the second arrayed AWG, a clad layer on the waveguide array of each AWG can be formed of a thin metal film (Cr or the like) to form a heater. This heater can be used to adjust the temperature of the waveguide array in order to accurately control the operating wavelength of each AWG.

As described in the above embodiment, a second external filter may be formed of a single or a plurality of, for example, two or three substrates.

In addition, although the embodiment has been described in conjunction with the first filter comprised of an AWG, a filter may be comprised of circuits other than an AWG.

Furthermore, although the silica-based-glass waveguides have been described, similar effects can be obtained using other waveguides consisting of a semiconductor or a polymer. The present invention does not limit the material constituting waveguides.

The present invention has been described in detail with respect to preferred embodiments, and it will now be apparent from the foregoing to those skilled in the art that changes and modifications may be made without departing from the invention in its broader aspect, and it is the invention, therefore, in the apparent claims to cover all such changes and modifications as fall within the true spirit of the invention.

What is claimed is:

1. A WDM filter as a first filter for splitting a light into signal lights of different wavelengths for WDM communication in which a plurality of wavelengths propagate through an optical fiber, the WDM filter-having a plurality of output ports corresponding-to each of the wavelengths, wherein:

a plurality of planar lightguide circuits each comprising an optical waveguide comprising a core and a clad formed on a planar substrate are arranged so as to be individually connected to the corresponding output ports of the first WDM filter, wherein:

the planar lightguide circuits are a second filter, and wherein:

the plurality of planar lightguide circuits connected to the corresponding output ports of the first WDM filter are formed a single or a plurality of substrates.

2. A WDM filter according to claim 1 wherein the planar lightguide circuits acting as the filter have different center or cutoff wavelengths.

3. A WDM filter according to claim 2 wherein the planar lightguide circuits are AWG lightguide circuits, and wherein the AWG lightguide circuits are formed on a single or a plurality of substrates.

4. A WDM filter according to claim 3 wherein in the AWG lightguide circuits acting as the second filter and connected to the corresponding output waveguides of the first filter, a thin-film metal heater is deposited on the clad layer on the arrayed waveguide.

5. A WDM filter according to claim 3 wherein in the plurality of AWG lightguide circuits connected to the corresponding output waveguides of the first filter to constitute the second filter, the inputs and the outputs are provided on a one-to-one correspondence.

6. A WDM filter according to claim 3 wherein in the plurality of AWGs connected to the corresponding output waveguides of the first filter to constitute the second filter, the AWGs are arrayed on the substrate in both the longitudinal and lateral directions thereof.

7. A WDM filter according to claim 3 wherein in the plurality of AWGs connected to the corresponding output waveguides of the first filter to constitute the second filter, the AWGs are arrayed on the substrate in both the longitudinal and lateral directions thereof, the AWGs being symmetrically arranged on the input and output sides, the AWGs having an equal optical path length.

8. A WDM filter according to claim 2 wherein the planar lightguide circuit has grooves formed therein and interference film filters inserted into the corresponding grooves.

9. A WDM filter according to claim 2 wherein the planar lightguide circuits each comprise directional couplers and Bragg gratings, and are formed on a single or a plurality of substrates.

10. A WDM filter according to claim 9 comprising the lightguide circuits each including Bragg gratings and connected to the corresponding output waveguides of the first filter to constitute the second filter, the input waveguides of the first filter each include an optical isolator.

11. A WDM filter according to claim 1 wherein the planar lightguide circuits are a bandpass filter.

12. A WDM filter according to claim 11 wherein the planar lightguide circuits acting as the bandpass filter have a larger bandwidth than the first filter.

13. A WDM filter according to claim 12 wherein the planar lightguide circuits are AWG lightguide circuits, and wherein the AWG lightguide circuits are formed on a single or a plurality of substrates.

14. A WDM filter according to claim 13 wherein in the AWG lightguide circuits acting as the second filter and connected to the corresponding output waveguides of the first filter, a thin-film metal heater is deposited on the clad layer on the arrayed waveguide.

15. A WDM filter according to claim 13 wherein in the plurality of AWG lightguide circuits connected to the corresponding output waveguides of the first filter to constitute the second filter, the inputs and the outputs are provided on a one-to-one correspondence.

16. A WDM filter according to claim 13 wherein in the plurality of AWGs connected to the corresponding output waveguides of the first filter to constitute the second filter, the AWGs are arrayed on the substrate in both the longitudinal and lateral directions thereof.

17. A WDM filter according to claim 13 wherein in the plurality of AWGs connected to the corresponding output waveguides of the first filter to constitute the second filter, the AWGs are arrayed on the substrate in both the longitudinal and lateral directions thereof, the AWGs being symmetrically arranged on the input and output sides, the AWGs having an equal optical path length.

18. A WDM filter according to claim 4 wherein the planar lightguide circuits each comprise directional couplers and Bragg gratings, and are formed on a single or a plurality of substrates.

19. A WDM filter according to claim 18 comprising the lightguide circuits each including Bragg gratings and connected to the corresponding output waveguides of the first filter to constitute the second filter, the input waveguides of the first filter each include an optical isolator.

20. A WDM filter according to claim 12 wherein the planar lightguide circuit has grooves formed therein and interference film filters inserted into the corresponding grooves.

21. A WDM filter according to claim 11 wherein the planar lightguide circuits each comprise directional couplers and Bragg gratings, and are formed on a single or a plurality of substrates.

22. A WDM filter according to claim 21 comprising the lightguide circuits each including Bragg gratings and connected to the corresponding output waveguides of the first filter to constitute the second filter, the input waveguides of the first filter each include an optical isolator.

23. A WDM filter according to claim 11 wherein the planar lightguide circuits are AWG lightguide circuits, and wherein the AWG lightguide circuits are formed on a single or a plurality of substrates.

24. A WDM filter according to claim 23 wherein in the AWG lightguide circuits acting as the second filter and connected to the corresponding output waveguides of the first filter, a thin-film metal heater is deposited on the clad layer on the arrayed waveguide.

25. A WDM filter according to claim 23 wherein in the plurality of AWG lightguide circuits connected to the corresponding output waveguides of the first filter to constitute the second filter, the inputs and the outputs are provided on a one-to-one correspondence.

26. A WDM filter according to claim 23 wherein in the plurality of AWGs connected to the corresponding output waveguides of the first filter to constitute the second filter, the AWGs are arrayed on the substrate in both the longitudinal and lateral directions thereof.

27. A WDM filter according to claim 23 wherein in the plurality of AWGs connected to the corresponding output waveguides of the first filter to constitute the second filter, the AWGs are arrayed on the substrate in both the longitudinal and lateral directions thereof, the AWGs being symmetrically arranged on the input and output sides, the AWGs having an equal optical path length.

28. A WDM filter according to claim 11 wherein the planar lightguide circuit has grooves formed therein and interference film filters inserted into the corresponding grooves.

29. A WDM filter according to claim 1 wherein the planar lightguide circuits each comprise directional couplers and Bragg gratings, and are formed on a single or a plurality of substrates.

30. A WDM filter according to claim 29 comprising the lightguide circuits each including Bragg gratings and connected to the corresponding output waveguides of the first filter to constitute the second filter, the input waveguides of the first filter each include an optical isolator.

31. A WDM filter according to claim 1 wherein the planar lightguide circuits are AWG lightguide circuits each comprising input and output waveguides, slab waveguides, and a large number of arrayed waveguides having different lengths, and wherein the AWG lightguide circuits are formed on a single or a plurality of substrates.

32. A WDM filter according to claim 31 wherein in the AWG lightguide circuits acting as the second filter and connected to the corresponding output waveguides of the first filter, a thin-film metal heater is deposited on the clad layer on the arrayed waveguide.

33. A WDM filter according to claim 31 wherein in the plurality of AWG lightguide circuits connected to the corresponding output waveguides of the first filter to constitute the second filter, the inputs and the outputs are provided on a one-to-one correspondence.

34. A WDM filter according to claim 31 wherein in the plurality of AWGs connected to the corresponding output waveguides of the first WDM filter to constitute the second filter, the AWGs are arrayed on the substrate in both the longitudinal and lateral directions thereof, the AWGs being symmetrically arranged on the input and output sides, the AWGs having an equal optical path length.

35. A WDM filter according to claim 31 wherein in the plurality of AWGs connected to the corresponding output waveguides of the first WDM filter to constitute the second filter, the AWGs are arrayed on the substrate in both the longitudinal and lateral directions thereof.

36. A WDM filter according to claim 1 wherein the planar lightguide circuit has grooves formed therein and interference film filters inserted into the corresponding grooves.

37. A WDM filter according to claim 1 wherein:
the first filter also comprises planar lightguide circuits, and wherein:
the first filter and the second filter are formed on a single or a plurality of planar substrates of an identical material.

38. A WDM filter as a first filter comprising an optical waveguide comprising a core and a clad formed on a planar substrate and principally including a plurality of input waveguides, a plurality of output waveguides, slab waveguides, and a large number of arrayed waveguides having different lengths, wherein:
planar lightguide circuits each including two or more Bragg gratings are arranged so as to be connected to the corresponding output waveguides, and wherein the circuits each including the BGs are formed on the same single substrate as in the AWG WDM first filter.

39. A WDM filter according to claim 38 comprising the lightguide circuits each including Bragg gratings and connected to the corresponding output waveguides of the first filter to constitute the second filter, the input waveguides of the first filter each include an optical isolator.

40. A WDM filter as a first filter comprising an optical waveguide comprising a core and a clad formed on a planar substrate and principally including a plurality of input waveguides, a plurality of output waveguides, slab waveguides, and a large number of arrayed waveguides having different lengths, wherein:
planar lightguide circuits connected to the corresponding output waveguides of the first AWG filter are an AWG bandpass filter, and are formed on the same single substrate as in the AWG, which is the first filter.

41. A WDM filter according to claim 40 wherein in the AWG lightguide circuits acting as the second filter and connected to the corresponding output waveguides of the first filter, a thin-film metal heater is deposited on the clad layer on the arrayed waveguide.

42. A WDM filter according to claim 40 wherein in the plurality of AWG lightguide circuits connected to the corresponding output waveguides of the first filter to constitute the second filter, the inputs and the outputs are provided on a one-to-one correspondence.

43. A WDM filter according to claim 40 wherein in the plurality of AWGs connected to the corresponding output waveguides of the first filter to constitute the second filter, the AWGs are arrayed on the substrate in both the longitudinal and lateral directions thereof.

44. A WDM filter according to claim 40 wherein in the plurality of AWGs connected to the corresponding output waveguides of the first WDM filter to constitute the second filter, the AWGs are arrayed on the substrate in both the longitudinal and lateral directions thereof, the AWGs being symmetrically arranged on the input and output sides, the AWGs having an equal optical path length.

* * * * *